US010362482B2

(12) United States Patent
Obaidi

(10) Patent No.: US 10,362,482 B2
(45) Date of Patent: Jul. 23, 2019

(54) NETWORK OPERATION AND TRUSTED EXECUTION ENVIRONMENT

(71) Applicant: T-Mobile USA, Inc., Bellevue, WA (US)

(72) Inventor: Ahmad Arash Obaidi, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 259 days.

(21) Appl. No.: 15/386,563

(22) Filed: Dec. 21, 2016

(65) Prior Publication Data

US 2018/0176775 A1 Jun. 21, 2018

(51) Int. Cl.

| | |
|---|---|
| ***H04W 12/06*** | (2009.01) |
| ***H04W 76/10*** | (2018.01) |
| ***G06F 21/53*** | (2013.01) |
| ***H04W 4/60*** | (2018.01) |
| *H04L 29/06* | (2006.01) |

(52) U.S. Cl.

CPC ............ *H04W 12/06* (2013.01); *G06F 21/53* (2013.01); *H04W 4/60* (2018.02); *H04W 76/10* (2018.02); *H04L 63/08* (2013.01); *H04L 63/0823* (2013.01)

(58) Field of Classification Search

None

See application file for complete search history.

(56) References Cited

U.S. PATENT DOCUMENTS 7,319,715 B1 1/2008 Souissi et al.
8,112,066 B2 * 2/2012 Ben Ayed ............ G06Q 20/108 455/411
8,443,071 B2 5/2013 Lu et al.

(Continued)

FOREIGN PATENT DOCUMENTS

KR 1020130125385 11/2013
WO WO2015/172803 A1 11/2015

OTHER PUBLICATIONS

Office Action for U.S. Appl. No. 15/135,081, dated Jan. 16, 2018, Kress, "Hub Device", 18 pages.

(Continued)

*Primary Examiner* — Ali Shayanfar
(74) *Attorney, Agent, or Firm* — Lee & Hayes, P.C.

(57) ABSTRACT

Example techniques described herein can provision network functional modules for execution in trusted execution environments of portable computing devices. A monitoring application of a portable computing device can validate a trusted execution environment of the portable computing device, determine a present operational capacity of the portable computing device, and transmit indications of the validation and the present operational capacity to a control node via an authenticated connection. The application can detect a remote computing device on one network and determine that the remote device has a trusted execution environment. The application can report the computing device to the control node on another network. A network functional module can receive a request and determine that the portable computing device cannot perform an operation of the request. The module can select another computing device and transmit an indication of the operation to the selected computing device via an authenticated connection.

20 Claims, 10 Drawing Sheets

(56) References Cited

U.S. PATENT DOCUMENTS 8,566,947 B1 10/2013 Sankruthi
8,971,803 B2 3/2015 Dua
9,100,426 B1 8/2015 Fang
9,125,027 B2 9/2015 Koenig et al.
9,160,420 B2 10/2015 Dua
9,606,817 B1 3/2017 Efstathopoulos
9,674,763 B2 6/2017 Mufti
2002/0057786 A1 5/2002 Donovan et al.
2002/0163895 A1 11/2002 Haller et al.
2003/0035397 A1 2/2003 Haller et al.
2004/0186897 A1 9/2004 Knauerhase et al.
2004/0249915 A1 12/2004 Russell
2005/0213516 A1 9/2005 Ramirez, II et al.
2005/0213590 A1 9/2005 Hauenstein et al.
2007/0143390 A1 6/2007 Giambalvo et al.
2007/0293197 A1 12/2007 Ekberg et al.
2008/0155249 A1 6/2008 Backof et al.
2008/0220757 A1 9/2008 Zeller et al.
2009/0006503 A1 1/2009 Bernardi et al.
2009/0216349 A1* 8/2009 Kwon ............... H04W 52/0219 700/33
2009/0319613 A1 12/2009 Hjelm et al.
2010/0323714 A1* 12/2010 Schmidt ................ H04W 48/18 455/456.1
2011/0047282 A1 2/2011 Denman et al.
2011/0202418 A1* 8/2011 Kempton .............. B60L 53/665 705/26.1
2011/0320520 A1 12/2011 Jain
2012/0198084 A1 8/2012 Keskitalo et al.
2014/0085502 A1 3/2014 Lin et al.
2014/0150064 A1* 5/2014 Wifvesson .............. H04L 63/08 726/3
2014/0227976 A1 8/2014 Callaghan et al.
2014/0248848 A1 9/2014 Mufti et al.
2014/0269425 A1 9/2014 Fisher et al.
2014/0269496 A1 9/2014 Mufti
2014/0328241 A1 11/2014 Subramanian et al.
2014/0355446 A1 12/2014 Altman
2014/0370895 A1 12/2014 Pandey et al.
2015/0087325 A1 3/2015 Nuss et al.
2015/0135283 A1* 5/2015 Tofighbakhsh ......... H04L 63/08 726/5
2015/0138952 A1 5/2015 Tamura et al.
2015/0178064 A1 6/2015 Cairns et al.
2015/0180730 A1 6/2015 Felstaine et al.
2015/0195236 A1* 7/2015 Nie ....................... G06F 21/554 726/11
2015/0208320 A1* 7/2015 Alexander .......... H04W 40/246 370/254
2015/0223252 A1 8/2015 Yan
2015/0281939 A1 10/2015 Li et al.
2015/0282077 A1* 10/2015 Yavuz ............... H04W 52/0212 455/452.1
2015/0326448 A1 11/2015 Chaudhary et al.
2015/0333979 A1 11/2015 Schwengler et al.
2015/0350947 A1* 12/2015 Khayrallah ....... H04W 28/0268 380/31
2015/0365217 A1 12/2015 Scholten et al.
2016/0021238 A1* 1/2016 Abramson ............ H04W 48/04 455/418
2016/0037569 A1 2/2016 Kim et al.
2016/0088064 A1 3/2016 Chen et al.
2016/0323161 A1 11/2016 Cuervo Laffaye et al.
2016/0330140 A1 11/2016 Cook et al.
2016/0378454 A1 12/2016 Nekrestyanov et al.
2017/0052806 A1 2/2017 Akiyoshi
2017/0063598 A1 3/2017 Zhu et al.
2017/0099347 A1 4/2017 Pucha et al.
2017/0164417 A1* 6/2017 Kress .................... H04W 76/14
2017/0257229 A1 9/2017 Fisher et al.
2017/0318479 A1 11/2017 Cotanis et al.
2017/0353556 A1 12/2017 Seenappa et al.
2018/0097775 A1 4/2018 Obaidi
2018/0098230 A1 4/2018 Obaidi

OTHER PUBLICATIONS

"Cisco NFV Solution: Enabling Rapid Service Innovation in the Era of Virtualization", White Paper, SISCO Oct. 2014, Retrieved from https://www.cisco.com/c/dam/globalshared/assets/pdf/sp04/nfv-solution.pdf, 9 pgs.

PCT Search Report and Written Opinion dated Jan. 11, 2018 for PCT application No. PCT/US17/54199, 14 pages.

PCT Search Report and Written Opinion dated Jan. 20, 2018 for PCT application No. PCT/US17/54200, 12 pages.

PCT Search Report and Written Opinion dated Feburary 2, 2017 for PCT application No. PCT/US2016/063371, 11 pages.

Office Action for U.S. Appl. No. 15/282,297, dated Apr. 6, 2018, Obaidi, "Dynamic Provisioning of a Firewall Role to User Devices", 7 pgs.

Office Action for U.S. Appl. No. 15/282,385, dated May 1, 2018, Obaidi, "Dynamic Provisioning of a Gateway Role to User Devices", 22 pgs.

Office Action for U.S. Appl. No. 15/282,385, dated Oct. 1, 2018, Obaidi, "Dynamic Provisioning of a Gateway Role to User Devices", 29 pgs.

Office action for U.S. Appl. No. 15/828,201, dated Aug. 27, 2018, Yocam, "Peer-To-Peer Distribution of Radio Protocol Data for Software Defined Radio (SDR) Updates", 24 pages.

Audet, F., "The Use of the SIPS URI Scheme in the Session Initiation Protocol (SIP)", Network Working Group, Request for Comments 5630, Standards Track, Oct. 2009, pp. 1-21 and 51.

Bappalige, S.P., "An Introduction to Apache Hadoop", Opensource.com, retrieved on Dec. 20, 2016 from <<https://opensource.com/life/14/8/intro-apache-hadoop-big-data>>, 16 pages.

"Fault Tolerant Computer System", Wikipedia, retrieved Jan. 25, 2017 from <<https://en.wikipedia.org/wiki/Fault-tolerant_computer_system>>, 5 pages.

Hamlin, K., "A Study on SETI@home Distributed Network", Department of Computer Science, Wichita State University, retrieved from <<http://www.cs.wichita.edu/~chang/lecture/cs843/project/paper/kh-stei.pdf >>, 11 pages.

"Hot Spare", Wikipedia, retrieved Jan. 25, 2017 from <<https://en.wikipedia.org/wiki/Hot_spare>>, 3 pages.

Jennings, et al., "Managing Client-Initiated Connections in the Session Initiation Protocol (SIP)", Network Working Group, Request for Comments 5626, Standards Track, Oct. 20019, pp. 1-4, 6-18, 21-25, and 44-45.

Kallenberg, C., "Setup for Failure: Defeating Secure Boot", The MITRE Corporation, Mar. 6, 2014, retrieved from <<https://infocon.org/cons/SyScan/SyScan%202014%20Singapore/SyScan%202014%20presentations/SyScan2014_CoreyKallenberg_SetupforFailureDefeatingSecureBoot_WP.pdf>>, 4 pages.

"MyTAM—Intercede", retrieved Jan. 25, 2017 from <<https://www.intercede.com/products-mytam>>, 9 pages.

Proudler, G., "What's in a Trusted Computing Platform?", InformIt, Aug. 23, 2002, retrieved from <<http://www.informit.com/articles/printerfriendly/28804>>, 6 pages.

Regenscheid, A., "Roots of Trust in Mobile Devices", ISPAB, Feb. 2012, retrieved from <<http://csrc.nist.gov/groups/SMA/ispab/documents/minutes/2012-02/feb1_mobility-roots-of-trust_regenscheid.pdf>>, 5 pages.

"Security Enhancements in Android 4.3", Android Open Source Project, retrieved Jan. 25, 2017, from <<https://source.android.com/security/enhancements/enhancements43.html>>, 1 page.

"Trust Zone—Arm Developer", retrieved Jan. 25, 2017 from <<https://developer.arm.com/technologies/trustzone>>, 7 pages.

"Trusted Execution Environment", Wikipedia, retrieved Jan. 25, 2017 from <<https://en.wikipedia.org/wiki/Trusted_execution_environment>>. 5 pages.

"Trusted Execution Technology", Wikipedia, retrieved Jan. 25, 2017 from <<https://en.wikipedia.org/wiki/Trusted_Execution_Technology>>, 5 pages.

"Trusted Platform Module", Wikipedia, retrieved Jan. 25, 2017 from <<https://en.wikipedia.org/wiki/Trusted_Plafform_Module>>, 10 pages.

(56) References Cited

OTHER PUBLICATIONS

Office action for U.S. Appl. No. 15/135,081, dated Jun. 14, 2017, Kress, "Hub Device", 18 pages.
The Extended European Search Report dated May 9, 2019, for European Patent Application No. 16871293.3, 11 pages.

* cited by examiner

100
Backbone 110
Infrastructure Node 106(1)
Infrastructure Node 106(2)
Infrastructure Node 106(M)
Registry 114
Remote Computing Device 118
116
102(N)
Bootstrap Control Node 112
104
Access Network 108(1)
Access Network 108(J)
120
122
102(1)
102(2)
102(3)

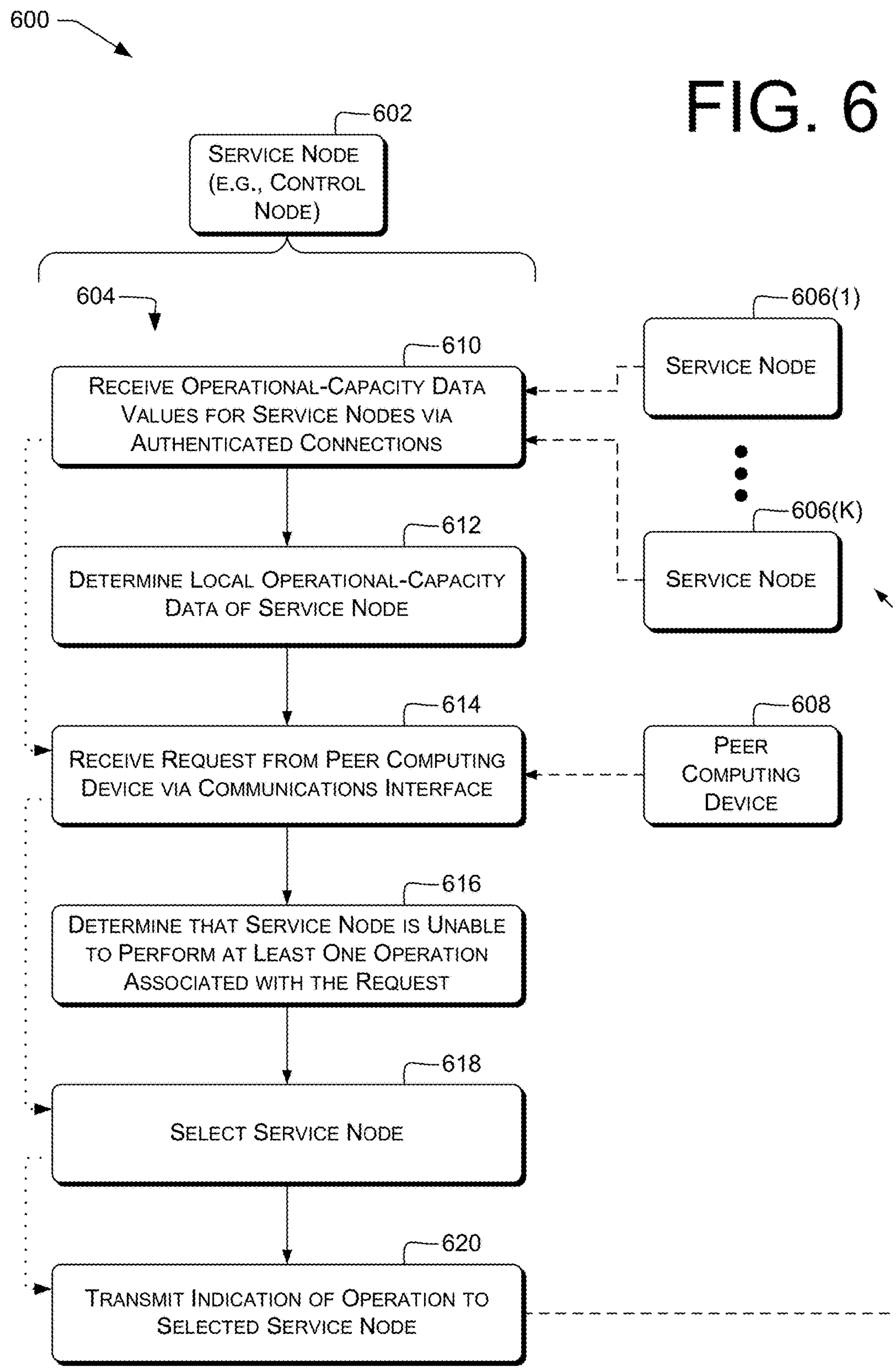
600
FIG. 6
602
Service Node (e.g., Control Node)
604
610
Receive Operational-Capacity Data Values for Service Nodes via Authenticated Connections
606(1)
Service Node
612
Determine Local Operational-Capacity Data of Service Node
606(K)
Service Node
614
Receive Request from Peer Computing Device via Communications Interface
608
Peer Computing Device
616
Determine that Service Node is Unable to Perform at Least One Operation Associated with the Request
618
Select Service Node
620
Transmit Indication of Operation to Selected Service Node

NETWORK OPERATION AND TRUSTED EXECUTION ENVIRONMENT

BACKGROUND

A computing device configured for telecommunications, such as a wireless smartphone, is generally capable of providing a user various communications services. Such devices can be used, e.g., to make voice calls, check email and text messages, update social media pages, stream media, browse websites, and so forth. In addition, the internet of things (IoT) may include a network of user devices, vehicles, buildings, etc., that have embedded therein various electronics, software, sensors, actuators, and network connectivity that enable these devices, collectively referred to herein as user devices, to collect and exchange data via wireless communication.

As computing-device power and wireless data traffic grow, users increasingly expect their user devices to provide many functions, including reliably working on a mobile communication network to receive constant and dependable telecommunication and data communication services. The rapid proliferation of wireless networks, mobile computing applications, and IoT devices has put additional demands on mobile communication networks. For example, cell towers of wireless access networks, or core network devices facilitating mobile communications, may be over-burdened by the number of user devices that are attempting to concurrently communicate using particular network towers or core devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items. For brevity of illustration, in the diagrams herein, an arrow beginning with a diamond connects a first component or operation (at the diamond end) to at least one second component or operation that is or can be included in the first component or operation.

FIG. 6 illustrates an example environment and process for scheduling tasks or processing requests in a telecommunications network according to some implementations.

DETAILED DESCRIPTION

Overview

Figure 1:
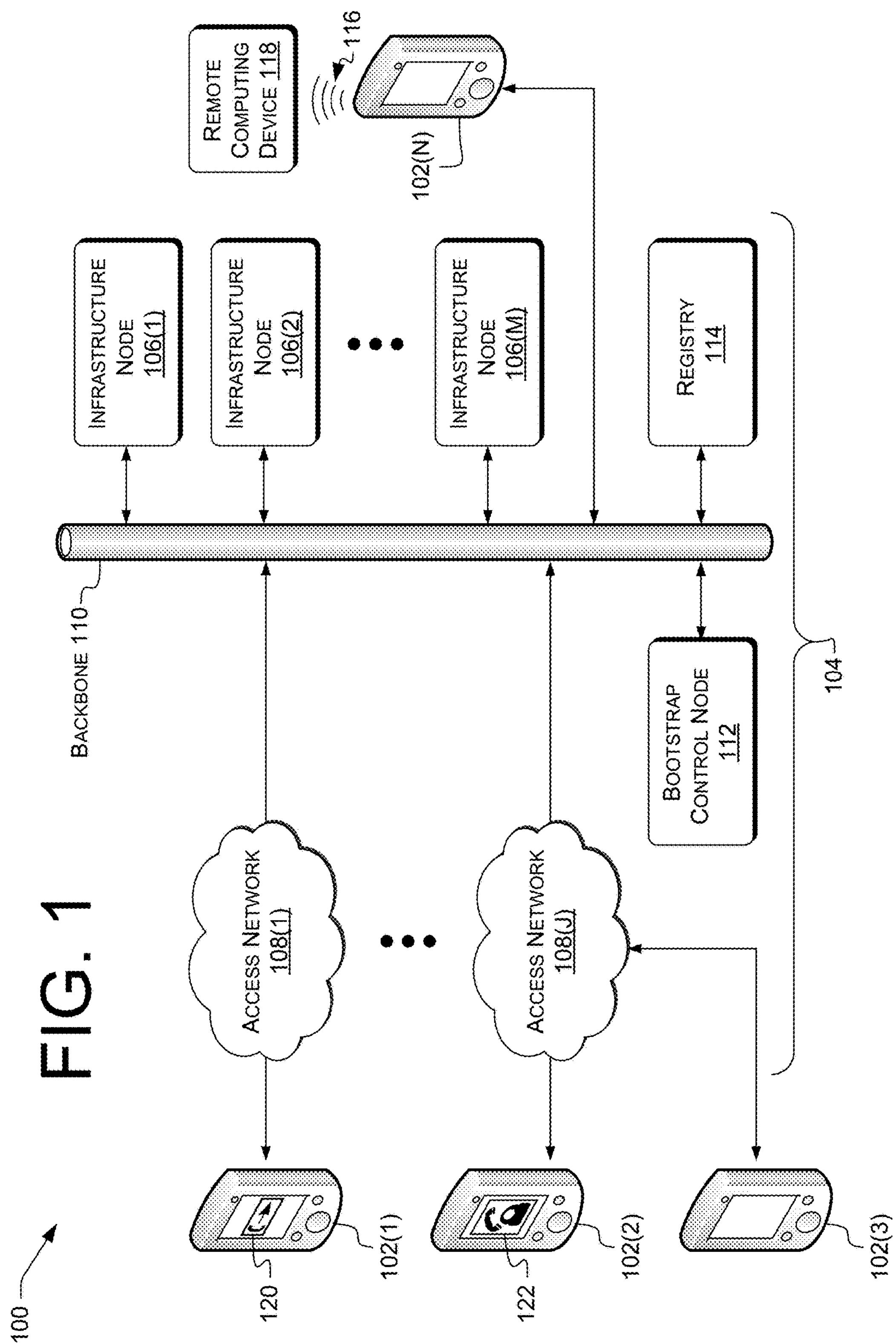
FIG. 1 is a block diagram illustrating a telecommunication system according to some implementations.

As the number of user devices, IoT devices, and other computing devices that can communicate over mobile communications networks increases, there is an increasing need for ways for network operators to improve availability of channel distribution and other network resources to accommodate the increasing demand. Some operators have begun using "cloud" arrangements for their network core devices. In cloud configurations, a network operator rents or purchases access to resources such as computing power, software, data-storage capacity, or information over a network, such as the Internet. Some providers of cloud services provision cluster computing systems ("computing clusters" or "clusters") having several discrete computing nodes that work together to accomplish a computing task assigned to the cluster as a whole. For example, a cloud-hosted computing cluster may perform the functions of nodes in an Evolved Packet Core (EPC) of a Long Term Evolution (LTE) access network, or of nodes in an Internet Protocol (IP) Multimedia Subsystem (IMS) core network. Nodes in a cluster can, e.g., share resources, balance load, increase performance, and/or provide fail-over support and/or redundancy. Moreover, nodes can be added to or removed from a cluster at any time, so that the resources provided by the cluster scale to match the demand placed on a cluster by the mobile-network operator. The term "resource" used with reference to clusters, nodes, and jobs refers generally to any commodity and/or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space and/or mounting/unmounting services, electrical power, etc.

Although cloud- and cluster-based provisioning of core network devices can permit a mobile-network operator's core network to scale in capacity as demand increases, the cloud itself can become a bottleneck. For example, if an operator consolidates functions formerly performed by geographically dispersed EPC nodes into a cloud provider's data center, the bandwidth of that data center's network connection(s) can limit performance of the operator's mobile network, even if ample computational resources are available in the data center. Moreover, network transit times between nodes can introduce unacceptable delay in device performance. For example, transit across the continental United States east-to-west generally introduces 70-80 ms of latency. If a data center in San Francisco is providing service to a computing device in New York, the round-trip latency for that service may be 140-160 ms, for example. This is above the 100 ms threshold of human temporal perception, so may cause delays which users perceive, and to which they object.

The term "session" as used herein includes a communications path via at least one telecommunications network for exchange of data among two or more computing devices, referred to as "terminals" of the session. Example sessions include voice and video calls, e.g., by which human beings converse, data communication sessions, e.g., between two electronic systems or between an electronic system and a human being, or Rich Communication Services (RCS, also known as JOYN) sessions. In many networks, these and other types of sessions are facilitated by access-network devices, core-network devices, or other computing devices. These devices are referred to individually or collectively herein as "service nodes," and the functions performed by service nodes in facilitating sessions are referred to as "service functions." Examples of service nodes can include at least one of: an LTE serving gateway (S-GW), an LTE packet data net (PDN gateway or P-GW), or an IMS serving call session control function (S-CSCF). Other example service nodes are discussed below. As used herein, "infrastructure nodes" are service nodes that are controlled or managed directly by a network operator. Infrastructure nodes do not include smartphones or other terminals purchased or leased by users of a communications network, unless those smartphones or other terminals are operated within a data center controlled by a network operator or cloud-service provider.

Example systems and techniques described herein permit terminals to function as service nodes for themselves or for other terminals. Unlike prior schemes in which service nodes are managed by network operators, examples herein permit using spare computational and network capacity on users' devices to perform service functions. Accordingly, some examples can permit service functions to be performed by user devices located close (physically or via the network) to terminals. This can reduce latency in performing service functions, improving user experience and increasing network capacity. This can also reduce bandwidth consumed in the network core, permitting an increase in network capacity or a reduction in core-network power consumption. Some examples can also permit rapidly transferring service functions from a first terminal to a second terminal in the event that the first terminal becomes overloaded or goes out of service. Transferring service functions can increase network robustness and reduce the amount of time required to recover from an unexpected failure of a service node. As used herein, therefore, "service nodes" can be user devices, e.g., UEs, operator-managed devices, or other network-connected devices, such as Internet of Things (IoT) devices.

Example networks carrying sessions include second-generation (2G) cellular networks such as the Global System for Mobile Communications (GSM) and third-generation (3G) cellular networks such as the Universal Mobile Telecommunications System (UMTS). Other example networks include fourth-generation (4G) cellular networks, such as LTE carrying voice over LTE (VoLTE) sessions using SIP signaling, the PSTN using Signaling System 7 (SS7) signaling, and data networks, such as Institute of Electrical and Electronics Engineers (IEEE) 802.11 ("WIFI") networks carrying voice over Internet Protocol (VoIP) calls or other over-the-top (OTT) sessions encapsulating, e.g., voice or video data in a way transparent to an underlying packet transport. Other example networks carrying sessions can include IMS-based networks, which can have various types of access networks, e.g., LTE or WIFI access networks. Techniques described herein can be used with these and other types of networks.

Illustrative Configurations

FIG. 1 is a block diagram illustrating a telecommunication system 100 according to some examples. The system includes computing devices 102(1)-102(N) (individually and/or collectively referred to herein with reference 102), for integer N≥1, e.g., user equipment or other mobile phones or communications devices or terminals, communicatively connectable with a telecommunications network 104. The computing devices 102 can be operated, e.g., by respective users (not shown). The computing devices 102 are communicatively connectable with one or more infrastructure node(s) 106(1)-106(M) (individually and/or collectively referred to herein with reference 106), for integer M≥1. For example, infrastructure nodes 106 can include EPC or IMS nodes, e.g., an S-CSCF of an IMS in a VoLTE-capable network, or one or more ASes, such as a TAS. In some examples, infrastructure nodes 106 can be operated by a cloud service provider or by a network operator. Computing devices 102 can be connectable with infrastructure nodes 106 via, e.g., access networks 108(1)-108(J) (individually and/or collectively referred to herein with reference 108), for integer J≥1. Access networks 108 can include, e.g., LTE access networks, WIFI networks, or access networks of other types described herein. For brevity, other components of telecommunications network 104 are omitted. For example, a proxy call session control function (P-CSCF) (which can itself be an infrastructure node 106) can relay communications from computing device 102(1) between access network 108 and an infrastructure node 106, e.g., an S-CSCF. In the illustrated example, communications among computing devices 102, access networks 108, and infrastructure nodes 106 can be conveyed via backbone 110, e.g., any combination of segments of the public Internet or segments of a private network, e.g., including common-carrier segments, leased lines, or any other wide-area local or backhaul network connections. Backbone 110 can additionally or alternatively include virtual network segments, e.g., virtual private network (VPN) secure connections over the public Internet.

In the illustrated example, a computing device 102(3), e.g., a terminal, is connected to access network 108(J). A computing device 102(N), e.g., a terminal, is connected to backbone 110. Computing devices 102(2) and 102(3) can communicate with each other via access network 108(J), and with computing devices 102(1) and 102(N) via access network 108(J) and backbone 110.

Computing devices 102 and infrastructure nodes 106 can communicate at least two types of information: signaling information and media information. Signaling and media information can be carried along common or different circuits or packet flows. For example, signaling and media can be carried as different packet flows in a common network, as respective packet flows in different networks, or any combination thereof. In some examples, signaling and media are conveyed via different service nodes. For example, signaling in a VoLTE session supporting Enhanced Single Radio Voice Call Continuity (eSRVCC) can be conveyed via an Access Transfer Control Function (ATCF), and media of the session can be conveyed via an Access Transfer Gateway (ATGW).

Signaling information can include information useful for establishing that a computing device 102 is eligible to receive service, e.g., SIP REGISTER or SUBSCRIBE requests, or 802.1X, RADIUS, or Diameter authentication-protocol messages. Signaling information can additionally or alternatively include information relating to call setup and teardown, e.g., SIP INVITE or BYE requests, or SIP 100 Trying, 180 Ringing, or 200 OK responses. Media information can include audio, video, or other user-specified or -accessible data of a communication session, e.g., carried via the Real-time Transport Protocol (RTP) and encoded using a selected codec. Nonlimiting example codecs can include an adaptive multi-rate (AMR) or International Telecommunications Union (ITU) G.711 audio codec, or an ITU H.263 or Moving Picture Experts Group (MPEG) MPEG-4 video or audiovisual codec.

In some examples, infrastructure nodes 106 can serve as anchoring network devices, which proxy signaling traffic for communication session(s) among computing devices 102, e.g., terminals. For example, an infrastructure node 106 can operate as a SIP proxy or back-to-back user agent (B2BUA). In some examples, an infrastructure node 106 (or other anchoring network device, and likewise throughout) can provide session-control services to computing devices 102.

In some examples, computing devices 102 and infrastructure nodes 106 can additionally or alternatively communicate work-sharing information, e.g., via the same network(s) as signaling information or media information, or via other network(s). "Work-sharing information," as used herein, refers to information used in provisioning and scheduling service functions across computing devices 102, e.g., terminals, and infrastructure nodes 106. Examples of work-sharing information can include at least authentication information, authorization information, computer program code and indications thereof, probe requests of responses, indications of capacity, or assignment of requests or operations to serving nodes.

In some examples, at least one computing device 102 or at least one infrastructure node 106 can be configured to communicate with a bootstrap control node 112, e.g., embodied in or implemented using an infrastructure node 106. Bootstrap control node 112 can coordinate transmission of work-sharing information and scheduling of service functions. Such coordination is an example of a service function. Therefore, bootstrap control node 112 can direct a computing device 102 or an infrastructure node 106 to perform coordination service functions. In some examples, bootstrap control node 112 is configured to perform coordination service functions when no computing device 102 or infrastructure node 106 is available to do so, or when no computing device 102 is available to do so. Communications between computing device(s) 102, infrastructure node(s) 106, or bootstrap control node 112 can be carried out via protocols such as those described below with reference to operation 302.

In some examples, at least one computing device 102 or at least one infrastructure node 106 can be configured to communicate with a registry 114. Registry 114 can be or include an authorization or authentication server, e.g., a home location register (HLR) or home subscriber server (HSS). Computing devices 102 or Infrastructure nodes 106 can communicate with registry 114, e.g., via the SIP or Diameter protocols or other protocols, e.g., over the LTE Sh interface or other appropriate interfaces. Registry 114 can be embodied in or implemented using an infrastructure node 106.

In the illustrated example, computing device 102(N), e.g., a terminal, is communicatively connectable with a second network 116 different from the telecommunications network 104. The second network 116 is depicted as a wireless network and can additionally or alternatively include a wired network. The computing device 102(N) can communicate via the second network 116 with a remote computing device 118. For example, the second network 116 can include a BLUETOOTH network, a ZIGBEE short-range network or other personal-area network (PAN), a WIFI network, a power-line home-automation network such as X10 or HOMEPLUG, a wireless home-automation network such as Z-WAVE, or a wired device connection such as a USB, FIREWIRE, or THUNDERBOLT connection between computing device 102(N) and remote computing device 118.

In some examples, telecommunications network 104 (or a portion thereof) and second network 116 can include similar technology but operating with different parameters that prevent direct interconnection of networks 104 and 116, e.g., two LTE networks on different bands. Some examples include LTE networks operated by different operators in the same market. In some examples telecommunications network 104 can be a Third-Generation Partnership Project (3GPP) network (e.g., an Evolved Packet System, EPS, network with an IMS core) and second network 116 can be a WIFI network. In some examples, the first network 104 and the second network 116 can be incompatible, i.e., transceivers configured to communicate via the first network 104 cannot communicate via the second network 116. In some examples, the first network 104 and the second network 116 can be different but compatible. For example, a 10BASE-T Ethernet network and a 100BASE-T Ethernet network can be compatible, since a 100BASE-T transceiver can operate in 10BASE-T mode.

As used herein, the term "remote" used in naming remote computing device 118 merely signifies that remote computing device 118 is not directly accessible via telecommunications network 104. The term "remote" does not require any particular distance between computing device 102(N) and remote computing device 118. For example, computing device 102(N) can be a BLUETOOTH-equipped smartphone carried in a purse or pocket, and remote computing device 118 can be BLUETOOTH-equipped smartwatch physically located within about two feet (about 61 cm) of the computing device 102(N).

In some examples, remote computing device 118 can include a peripheral such as a printer, scanner, set-top box (e.g., a ROKU or COMCAST set-top box), or dedicated user-interface device (e.g., a GOOGLE HOME virtual-assistant device). In some examples, remote computing device 118 can include a standalone computing device such as a home-security-system controller, smart thermostat, or other domestic embedded computing device. In some examples, remote computing device 118 can include an IoT device and second network 116 can include an IoT communications network employing, e.g., Radiofrequency Identification (RFID), Near-Field Communications (NFC), Z-WAVE, or ZIGBEE. In some examples, remote computing device 118 can include a durable good including a computing device, e.g., an automobile, lawn tractor, or other vehicle.

When a computing device 102 powers up or connects to the telecommunications network, computing device 102 can transmit a registration request, e.g., SIP REGISTER request. As used herein, the term "request" signifies a message transmission to which a response is expected for normal functioning of network service(s) associated with the request. For example, computing device 102 can transmit a SIP REGISTER request and then expect a SIP 401 Unauthorized or SIP 200 OK response indicating the status of an attempted registration included in the REGISTER request.

A registration request can include, e.g., registration information associated with computing device 102. Registration information can include identification information or authorization information. Identification information can include, e.g., a terminal identifier such as an international mobile equipment identity (IMEI), a user identifier such as an international mobile subscriber identity (IMSI), a network identifier such as a mobile country code (MCC) and a mobile network code (MNC), a user address such as an ITU E.164 international-dialing-plan telephone number, mobile station international subscriber directory number (MSISDN), or network address, such as an Internet IPv4 or IPv6 address, or a country code, e.g., indicating a country in which computing device 102 is located. Authorization information can include, e.g., a username, password, password hash, challenge response, cryptographic ticket, or other information usable by an authorization function of registry 114, e.g., independently or in association with the identification information, to determine access to services of telecommunications network 104 that should be provided to computing device 102.

In an example of a session, call initiation can be performed, e.g., as defined in the Global System for Mobile (GSM) or voice-over-Long Term Evolution (VoLTE) standards, and can include the exchange of messages (not shown) between the computing devices 102 and the infrastructure node(s) 106 other service nodes. For example, the computing device 102, e.g., in response to actuation by the second user of a "Send" control 120, can transmit an initiation request of a communication session, e.g., a SIP INVITE request, to computing device 102(2). The user of computing device 102(2) can operate a call-acceptance control 122 such as a touchscreen button to cause computing device 102(2) to transmit a SIP 200 OK response to computing device 102(1) to establish the session. Once the session is established, data of the session, such as audio data or video data, can be exchanged between computing devices 102(1) and 102(2) via a media path.

The computing device 102(1) in this example is a session-originating device, i.e., a computing device initiating a communication session with another computing device. Session-originating devices can include user equipment or other telecommunications or computing devices communicatively connectable with other computing devices via one or more infrastructure node(s) 106. Mobile phones and copper-loop landline phones can be examples of session-originating devices.

Illustrative Components

Figure 2:
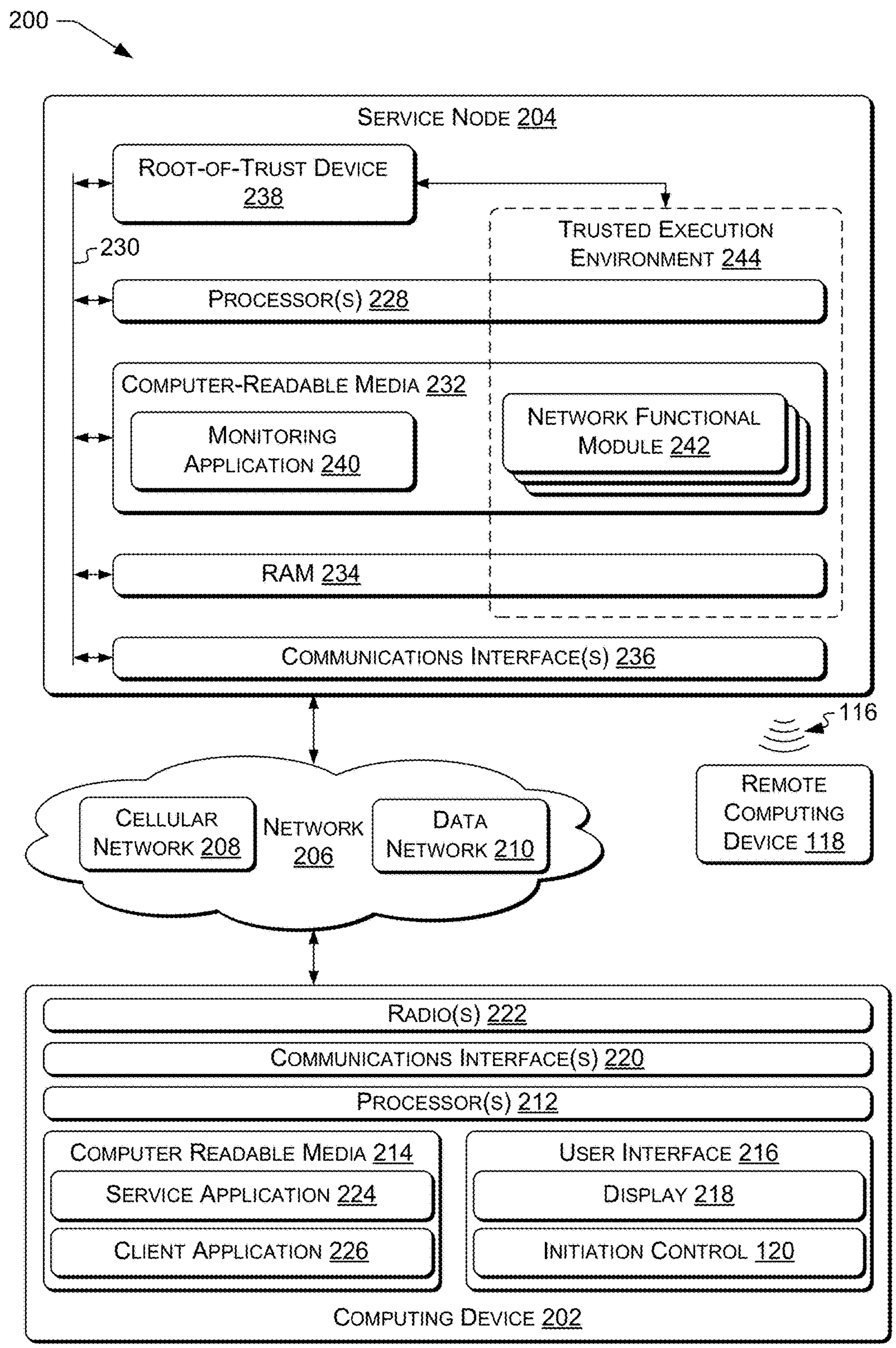
FIG. 2 is a block diagram illustrating components of a telecommunication system permitting work-sharing according to some implementations.

FIG. 2 is a block diagram illustrating a system 200 permitting work-sharing processing according to some implementations. The system 200 includes a computing device 202, e.g., a wireless phone or other user equipment, which can represent any or all of the computing device(s) 102 or the remote computing device 118, FIG. 1. The computing device 202 can be implemented as any suitable mobile computing devices configured to communicate over a wireless and/or wireline network, including, without limitation, a mobile phone (e.g., a smart phone) or other wireless or wired phone, a tablet computer, a laptop computer, a portable digital assistant (PDA), a wearable computer (e.g., electronic/smart glasses, a smart watch, a wristwatch, a fitness tracker, etc.), a networked digital camera, and/or similar mobile or fixed computing devices.

Although this description predominantly describes the computing devices 102, 118, and 202 as being "mobile" or "wireless," (e.g., configured to be carried and moved around), it is to be appreciated that the computing devices 102, 118, and 202 can represent various types of communication devices that are generally stationary as well, such as televisions, desktop computers, game consoles, set top boxes, and the like. In this sense, the terms "communication device," "wireless device," "wireline device," "mobile device," "computing device," "user equipment (UE)," and "terminal" may be used interchangeably herein to describe any communication or computing device capable of performing techniques described herein with respect to, e.g., computing devices 102, 118, and 202.

Computing device 202 can be coupled to a service node 204 via a telecommunications network 206, which can represent telecommunications network 104, FIG. 1. The service node 204 can be an example of the infrastructure node(s) 106, FIG. 1, e.g., an S-CSCF, TAS, or other AS. Additionally or alternatively, the service node 204 can be a terminal, e.g., another computing device 102, configured via transmissions of work-sharing information to perform service functions. Accordingly, service node 204 can additionally or alternatively include illustrated component(s) of computing device 202. Similarly, computing device 202 can additionally or alternatively include illustrated component(s) of service node 204. In some examples, computing device 202 or (as shown) service node 204 is communicatively connectable via second network 116 with remote computing device 118.

The network 206 can include one or more networks, such as a cellular network 208 and a data network 210. The network 206 can include one or more core network(s) connected to user equipment via one or more access network(s) 108. Example access networks include LTE (e.g., the Evolved UMTS Terrestrial Radio Access Network or EUTRAN), WIFI, GSM EDGE Radio Access Network (GERAN), UMTS Terrestrial Radio Access Network (UTRAN), and other cellular access networks.

The cellular network 208 can provide wide-area wireless coverage using a technology such as GSM, Code Division Multiple Access (CDMA), UMTS, LTE, or the like. Example networks include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), VoIP, VoLTE, IEEE 802.1* protocols such as 802.11 or 802.15, wireless microwave access (WIMAX), WIFI, and/or any future IP-based network technology or evolution of an existing IP-based network technology. Communications between the service node 204 and computing devices such as the computing device 202 can additionally or alternatively be performed using other technologies, such as wired (Plain Old Telephone Service, POTS, or PSTN lines), optical (e.g., Synchronous Optical NETwork, SONET) technologies, and the like.

The data network 210 can include various types of networks for transmitting and receiving data (e.g., data packets), including networks using technologies such as WIFI, IEEE 802.15.1 (BLUETOOTH), Asynchronous Transfer Mode (ATM), WIMAX, and other network technologies, e.g., configured to transport Internet Protocol (IP) packets. In some examples, the service node 204 includes or is communicatively connected with an interworking function (IWF) or other device bridging networks, e.g., LTE, 3G, and POTS networks. In some examples, the service node 204 can bridge SS7 traffic from the PSTN into the network 206, e.g., permitting PSTN customers to place calls to cellular customers and vice versa.

In some examples, the cellular network 208 and the data network 210 can carry voice or data. For example, the data network 210 can carry voice traffic using Voice over Internet Protocol (VoIP) or other technologies as well as data traffic, or the cellular network 208 can carry data packets using High Speed Packet Access (HSPA), LTE, or other technologies as well as voice traffic. Some cellular networks 208 carry both data and voice in a packet-switched format. For example, many LTE networks carry voice traffic in data packets according to the voice-over-LTE (VoLTE) standard. Some LTE networks can interconnect with WIFI access networks to permit IMS-mediated voice-over-WIFI (VoWIFI) calling. Various examples herein provide origination and termination of, e.g., carrier-grade voice calls on, e.g., circuit-switched (CS) networks 206 or mixed VoLTE/3G networks 206, and on computing devices 202 including original equipment manufacturer (OEM) handsets, non-OEM handsets, or computing devices running over-the-top (OTT) SIP client software.

The computing device 202 can include at least one processor 212, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media 214, such as memory (e.g., RAM, solid state drives (SSDs), or the like), disk drives (e.g., platter-based hard drives), another type of computer-readable media, or any combination thereof.

The computing device 202 can further include a user interface (UI) 216, e.g., including an electronic display device 218, a speaker, a vibration unit, a touchscreen, or other devices for presenting information to a user or receiving commands from the user. The user interface 216 can include a session-initiating user interface control 120, e.g., a touchscreen button, to indicate a communication session should be initiated. The user interface 216 or components thereof, e.g., the electronic display device 218, can be separate from the computing device 202 or integrated (e.g., as illustrated in FIG. 1) with the computing device 202.

The computing device 202 can further include one or more communications interface(s) 220 configured to selectively communicate via the network 206. For example, communications interface(s) 220 can operate one or more radio(s) 222 of computing device 202 to communicate via network 206. Radio(s) 222 can, e.g., communicate via access network(s) 108 of cellular network 208. Communications interface(s) 220 can additionally or alternatively include one or more transceivers or other components configured to communicate using wired connections via the network 206.

The computer readable media 214 can be used to store data and to store components that are operable by the processor 212 or instructions that are executable by the processor 212 to perform various functions as described herein. The computer readable media 214 can store various types of instructions and data, such as an operating system, device drivers, etc. Stored processor-executable instructions can be arranged in modules or components. Stored processor-executable instructions can be executed by the processor 212 to perform the various functions described herein.

The computer readable media 214 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processor 212. Tangible computer-readable media can include volatile and nonvolatile, removable and non-removable media implemented in any method or technology for storage of information, such as computer readable instructions, data structures, program modules, or other data.

The computer readable media 214 can include processor-executable instructions of a service application 224, a client application 226 or other modules or components. The service application 224 can permit computing device 202 to communicate work-sharing information and to perform service functions. In some examples, the processor-executable instructions of the service application 224 can be executed by the processor 212 to perform various functions described herein, e.g., with reference to service node 204.

The client application 226, e.g., a native or other dialer, can permit a user to originate and terminate communication sessions associated with the computing device 202, e.g., a wireless phone. In some examples, the processor-executable instructions of the client application 226 can be executed by the processor 212 to perform various functions described herein, e.g., registration or call setup or teardown as discussed herein with reference to FIG. 1, or transmitting requests, e.g., as discussed herein with reference to FIG. 4, 6, 7, or 10.

The service node 204 can include at least one processor 228 communicatively connectable via a bus 230 with at least one of: one or more computer readable media (CRM) 232, RAM 234, one or more communications interface(s) 236, or one or more root-of-trust devices 238.

The computer readable media 232 can be used to store processor-executable instructions of a monitoring application 240 or other modules or components. The processor-executable instructions of the monitoring application 240 can be executed by the processor 228 to perform various functions described herein, e.g., with reference to at least one of FIGS. 3-10.

The communications interface(s) 236, e.g., of any of the types described above with reference to communications interface(s) 220. For example, service node 204 can communicate via communications interface(s) 236 with at least one of bootstrap control node 112, registry 114, infrastructure node(s) 106, or remote computing device 118.

As discussed below with reference to FIGS. 3-10, monitoring application 240, in response to work-sharing information from a control node, can cause a network functional module 242 to be executed by the processor 228 in a trusted execution environment 244, e.g., a sandbox, dedicated hardware, or virtual machine conforming with predetermined security requirements. For example, the network functional module 242 can comprise a preloaded executable module, or a module of compiled JAVA or other platform-independent code. Network functional module 242 can comprise processor-executable instructions executable by the processor 228 to perform service functions, e.g., as described herein with reference to at least one of FIG. 4, 6, 7, or 10. For brevity, throughout this document, references to functions performed by a network functional module 242 signify those functions, when performed by the processor 228 in response to the instructions of the network functional module 242 executed in the trusted execution environment 244.

In some examples, trusted execution environment 244 can include a portion, timeslice, or execution mode of the processor 228, computer-readable media 232, RAM 234, communications interface(s) 236, or other resources of service node 204. For example, trusted execution environment 244 can be operated by a supervisor or hypervisor to prevent network functional module 242 from accessing protected instructions of processor 228, from accessing RAM 234 outside a designated area, or from modifying files on computer-readable media 232 other than those specifically designated for use by network functional module 242. Trusted execution environment 244 can additionally or alternatively be configured to prevent execution of unauthorized code. For example, trusted execution environment 244 can be configured to execute only network functional module(s) 242 that are signed or otherwise marked as approved by the network operator for execution. As discussed herein, network functional module(s) 242 can be transmitted between network devices to permit terminals (e.g., computing devices 102), infrastructure nodes 106, or remote computing devices 118 to perform service functions.

In some examples, service node 204 includes root-of-trust device 238, e.g., a Subscriber Identity Module (SIM), Trusted Platform Module (TPM), or other device configured to perform root-of-trust processing. For example, root-of-trust device 238 can cooperate with processor 228 to prove to computing device 202 that service node 204 is authorized to perform service functions. In some examples, root-of-trust device 238 can cooperate with processor 228 to determine whether network functional module(s) 242 are authorized for execution in the trusted execution environment 244. In some examples, root-of-trust device 238 can store cryptographic data such as at least one shared secret, private key, or unique identification value. In some examples, root-of-trust device 238 can include a random-number generator. As used herein, "random" can include truly random or pseudo-random unless expressly stated. In some examples, root-of-trust device 238 can compute cryptographic primitives, e.g., hashes or signatures. For example, processor 228 can provide data to root-of-trust device 238, which can cryptographically sign the data using a private key kept secret within root-of-trust device 238. Further examples of processing by or involving root-of-trust device 238 are discussed herein with reference to FIG. 3, 4, or 5.

In some examples, any of the following can be performed in series or in parallel, in any combination: processing operations performed by processor 228 outside trusted execution environment 244 (e.g., monitoring application 240), processing operations performed by processor 228 inside trusted execution environment 244 (e.g., network functional module 242), or processing operations performed by root-of-trust device 238. Although monitoring application 240 has been described as being outside trusted execution environment 244, in some examples, monitoring application 240 can execute in part or entirely within trusted execution environment 244.

Illustrative Processes

Figure 3:
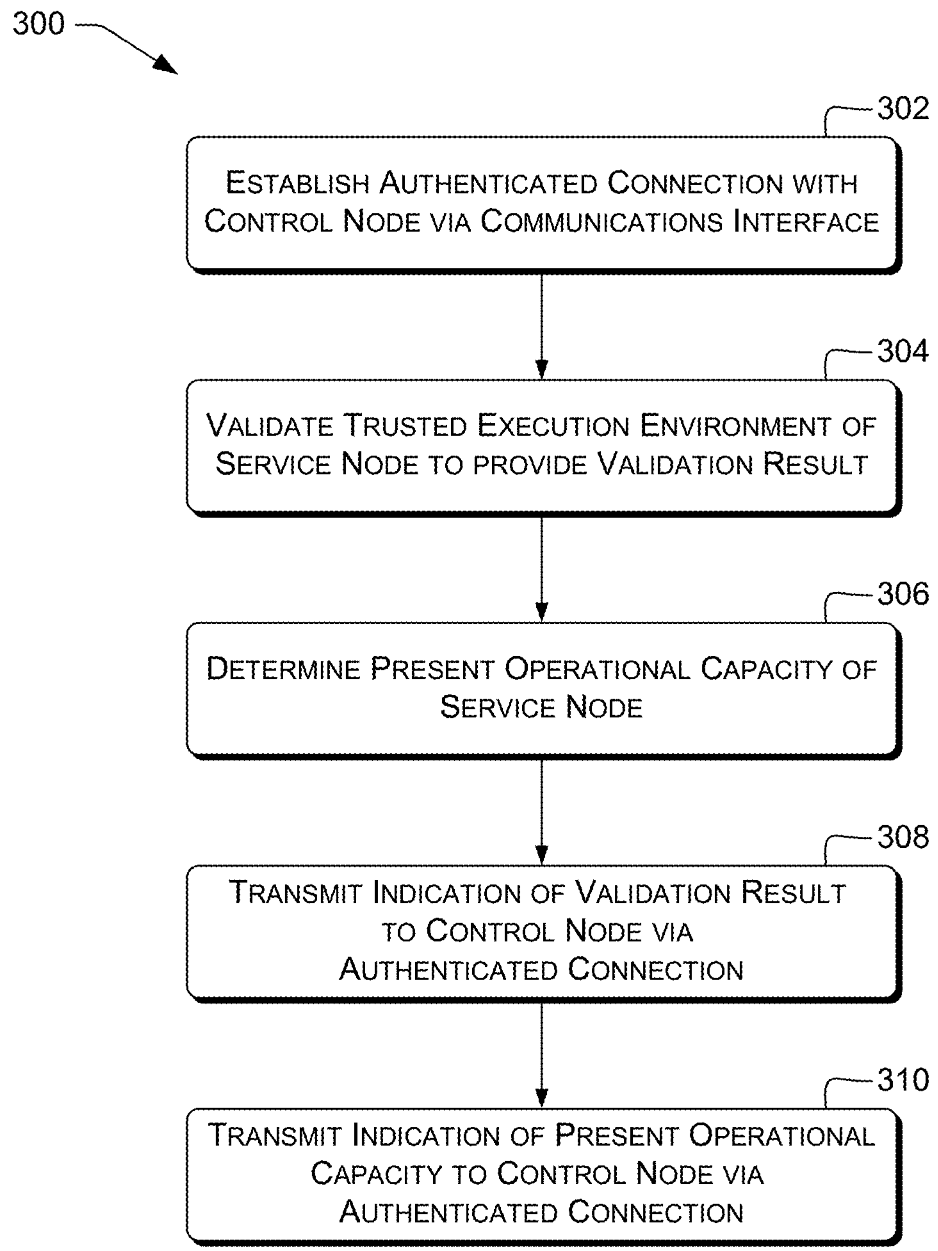
FIG. 3 illustrates an example process for configuring a terminal or other computing device to perform service functions in a telecommunications network according to some implementations.

FIG. 3 illustrates an example process 300 for configuring a terminal or other computing device 102, e.g., a portable computing device, to perform service functions in a telecommunications network 104. Process 300 can be performed, e.g., by a network device communicatively connectable with UE, e.g., infrastructure node 106, computing device 202, or service node 204. Process 300 can be performed by a device including a communications interface 236, e.g., configured to communicate via a wireless network or otherwise, as discussed above. Process 300 can be performed by a device including one or more processors 228 configured to perform operations described below, e.g., in response to computer program instructions of the monitoring application 240 stored on at least one computer-readable medium 232.

Operations shown in FIGS. 3-10 can be performed in any order except when otherwise specified, or when data from an earlier step is used in a later step. Any operation shown in multiple figures can be as discussed with reference to the first figure in which that operation is shown.

For clarity of explanation, reference is herein made to various components shown in FIGS. 1 and 2 that can carry out or participate in the steps of the exemplary method. It should be noted, however, that other components can be used; that is, exemplary method(s) shown in FIGS. 3-10 are not limited to being carried out by the identified components.

At 302, service node 204 can establish an authenticated connection with a control node via the communications interface 236. The authenticated connection can include any connection over which messages can be transmitted together with reliable information about the source of those messages. The authenticated connection can be established, e.g., using Transmission Control Protocol (TCP) over Internet Protocol (IP) or other protocols or protocol stacks. In some examples, the control node is the bootstrap control node 112. In some examples, the control node is a service node 204 configured to perform control or coordination functions. Establishing the authenticated connection can include at least one of: authentication of one of the service node 204 and the control node; authentication of both the service node 204 and the control node to each other; symmetric or asymmetric encryption of communications, e.g., using the Blowfish, Advanced Encryption Standard (AES), or Secure Sockets Layer (SSL)/Transport Layer Security (TLS) protocols (e.g., https); key exchange, e.g., using Diffie-Hellman or other algorithms; transmission of nonces; or computation of cryptographic signatures, e.g., using the Secure Hash Algorithm 3 (SHA-3) algorithms. In some examples, block 302 can include operating the root-of-trust device 238. In some examples, block 302 can include opening an SSL/TLS secured connection to the control node, e.g., a TLS SIP ("sips" URL scheme) connection.

At 304, service node 204 can validate a trusted execution environment 244 of the service node 204 to provide a validation result. For example, block 304 can include at least one of: hashing or checksumming of computer program code of the trusted execution environment 244; verification of cryptographic signatures of such program code; processing of such program code by a root-of-trust device 238; or configuring processor 228, e.g., via control-register writes, to operate in a mode enabling the trusted execution environment 244 (e.g., x86 protected mode instead of x86 real mode). The validation result can include, e.g., a Boolean value indicating whether or not the trusted execution environment 244 is valid, or a bitmask or other value set indicating specific feature(s) of the trusted execution environment 244 that are available for use. In some examples, the authenticated connection can be associated with the trusted execution environment 244, e.g., by virtue of code running the environment 244 communicating via the authenticated connection. In some examples, cryptographic primitives or routines used to authenticate or secure the authenticated connection can be executed at least partly in the trusted execution environment 244 or by the root-of-trust device 238.

In some examples, the trusted execution environment 244 or other program components executing on the service node 204 can be cryptographically signed, e.g., using a predetermined private key. The trusted execution environment 244 can be validated by confirming that the signature is associated with a well-known public key, e.g., stored in a non-volatile memory on service node 204 or computing device 102. In some examples, signature verification or other operations for validating the trusted execution environment 244 can be performed by dedicated hardware, e.g., implemented in an FPGA or in custom logic. In some examples, signature verification or other operations for validating the trusted execution environment 244 can be performed in a dedicated mode or core of a processor 212, e.g., the "TRUSTZONE" mode of an ARM processor.

In some examples, the trusted execution environment 244 can be or include a secure mode implemented by processor 212, e.g., TRUSTZONE, and computer program instructions of a loader executable in the secure mode to load programs ("trustlets") for execution in the secure mode. Such programs can be provisioned remotely in a secure manner, e.g., as in the MYTAM provisioning system by INTERCEDE. In some examples, the trusted execution environment 244 can be validated by challenge/response or other communications between the loader and a cloud service, or between programs loaded in respective trusted execution environments 244 of computing device 102 and service node 204.

At 306, service node 204 can determine a present operational capacity of the service node 204. "Operational capacity," as used herein, refers to availability of resources to perform service functions. For example, a smartphone (service node 204) having a 10 Mbit/s network capacity, of which 4.2 Mbit/s are in use for video streaming or other smartphone functions selected by the user, has an operational capacity of 5.8 Mbit/s.

In some examples, block 306 can include determining the present operational capacity based at least in part on at least one of the following: an available capacity (e.g., idle time) of the processor; an available capacity of a high-speed memory of the service node 204, e.g., RAM 234 or another memory storing the processor's working set; a signal strength of the wireless network at the service node 204; a transfer capacity (e.g., available bandwidth) of the communications interface; a present power supply situation of the service node 204 (e.g., plugged in and charging, plugged in and not charging, not plugged in and running on battery, battery low, or device in a standby or sleep condition); or a present battery capacity of a battery of the service node 204 (e.g., percent remaining or time until depletion).

At 308, service node 204 can transmit an indication of the validation result to the control node via the authenticated connection. For example, the indication can comprise the validation result or a packet including or otherwise indicating the validation result. The transmission at block 308 is an example of work-sharing information.

At 310, service node 204 can transmit an indication of the present operational capacity to the control node via the authenticated connection. This transmission is an example of work-sharing information. In some examples, the indications at blocks 308 and 310 can be combined in a single transmission, e.g., a Hypertext Transfer Protocol (HTTP) GET or POST request, a SIP INFO request, or another transaction.

The control node, upon receiving the indications of the validation result and the present operational capacity, can determine which service function(s) can be performed by service node 204. Examples are discussed herein, e.g., with reference to FIGS. 3, 6, 7, 9, and 10.

Figure 4:
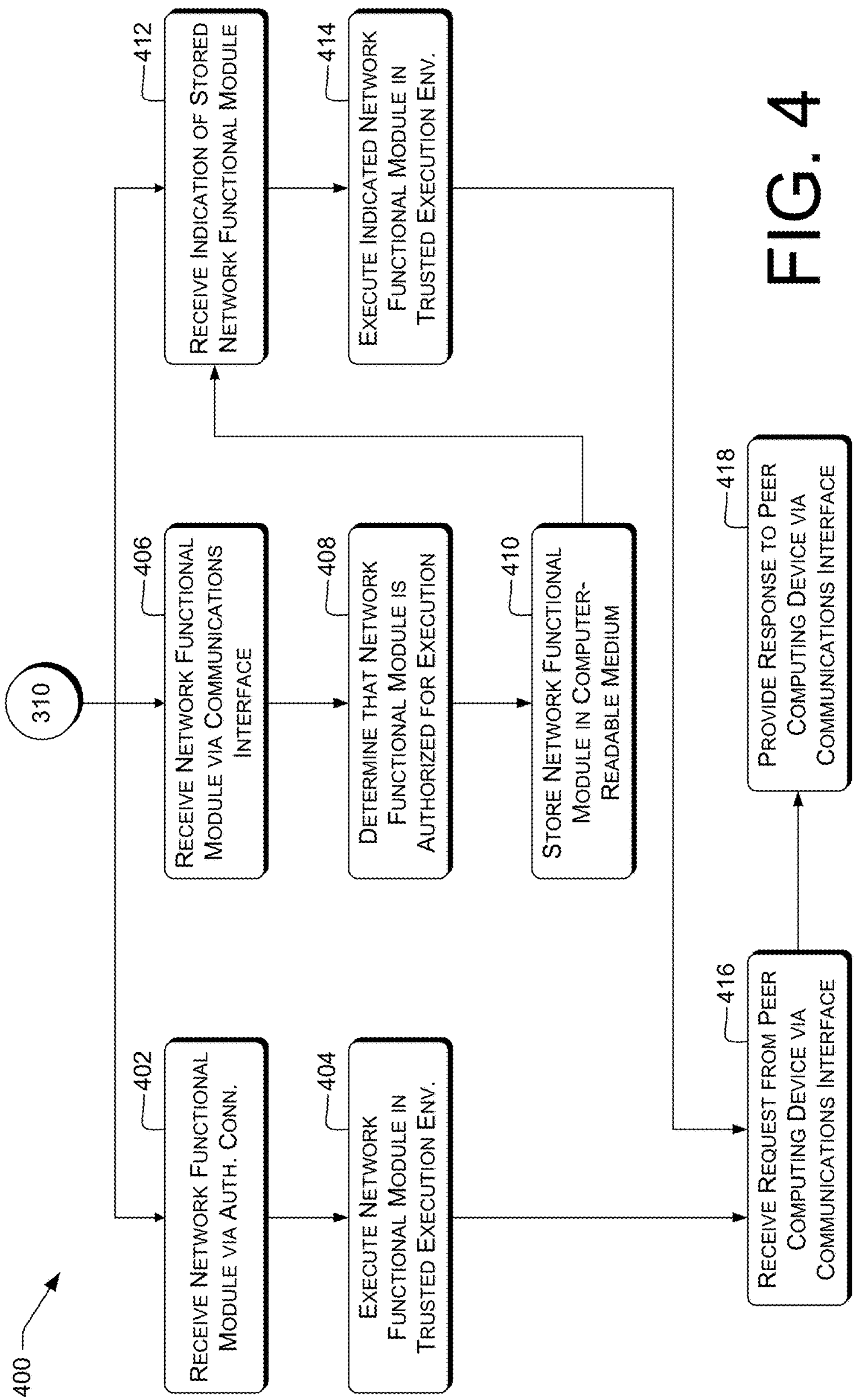
FIG. 4 illustrates an example process for performing service functions at an active service node of a telecommunications network according to some implementations.

FIG. 4 illustrates an example process 400 for performing service functions at an active (e.g., enabled and properly configured) service node 204. In some examples, block 310 is followed by block 402, block 406, or block 412.

At 402, the service node 204 can receive, via the authenticated connection, a network functional module 242. As discussed above, the network functional module 242 can include computer-executable instructions executable by the processor 228.

At 404, the service node 204 can configure the processor 228 to execute the network functional module 242 in the trusted execution environment 244. For example, the processor 228 can execute instructions of the monitoring application 240 that cause the processor 228 to enter a protected execution mode associated with the trusted execution environment 244 and to transfer control to the network functional module 242. Block 404 can be followed by block 416.

At 406, the service node 204 can receive, via the communications interface, the computer-executable instructions of a first network functional module 242 of the plurality of network functional modules.

At 408, the service node 204 can determine that the computer-executable instructions of the first network functional module are authorized for execution. For example, block 408 can include verifying a cryptographic signature or signature chain of the first network functional module; computing a hash or other value of the instructions of the network functional module; providing the contents of the network functional module to the root-of-trust device 238 and receiving a verification result, or other cryptographic or authentication processing described herein.

At 410, the service node 204 can store the computer-executable instructions of the first network functional module 242 in the at least one computer-readable medium 232. Block 410 can be followed by block 412.

At 412, the service node 204 can receive, via the authenticated connection, an indication of a selected network functional module 242 of a plurality of network functional modules. For example, as noted above with reference to FIG. 2, the at least one computer-readable medium 232 can include computer-executable instructions of a plurality of network functional modules 242. For example, the service node 204 can receive a universally unique identifier (UUID), JAVA or other class name, package name, or other identifier of a particular network functional module 242 that is to be executed.

At 414, the service node 204 can configure the processor 228 to execute the selected network functional module 242 in the trusted execution environment 244. Examples of configuring the processor are discussed herein, e.g., with reference to block 404.

In some examples, block 404 or block 414 can be followed by block 416. For example, blocks 402 and 404, blocks 406, 408, and 410, or blocks 412 and 414, can be performed by the service node 204 under control of the monitoring application 240. Blocks 416 and 418 can be performed by the service node 204 under control of the network functional module 242. Some examples using blocks 402 and 404, or blocks 406, 408, and 410, can provide increased flexibility and more effectively use available resources on a wide range of network devices, since code can be dynamically provisioned to network devices. Some examples using blocks 412 and 414 can reduce the bandwidth overhead of provisioning, since code is already stored at the devices at which it will be executed. These examples are not mutually exclusive. A single service node 204 can implement at least one of, or at least two of, the flow of blocks 402 and 404, the flow of blocks 406, 408, and 410, or the flow of blocks 412 and 414.

At 416, service node 204 can receive a request from a peer computing device via the communications interface. The peer computing device can include, e.g., a computing device 102 such as a terminal, an infrastructure node 106, or a remote computing device 118. In some examples, the network functional module 242 can listen on a predetermined network port for incoming requests, and block 416 can include receiving data of a request via that port. Examples of listeners that can be implemented in a network functional module 242 can include HTTP servers, SIP servers, or Remote Procedure Call (RPC) daemons or workers. The request can specify, e.g., a desired service function or predetermined portion thereof. For example, the request can include a SIP REGISTER request addressed to the service node 204 executing a network functional module 242 that provides the service functions of an S-CSCF.

At 418, service node 204 can provide a response to the peer computing device via the communications interface 236. For example, the network functional module 242 can perform processing associated with the request and return a response indicating whether the processing succeeded or failed. Continuing the example of a SIP REGISTER request, block 418 can include querying the registry 114, recording registration information, and issuing third-party REGISTER requests to ASes indicated by the registry 114. Block 418 can then include transmitting a SIP response to the peer computing device, e.g., a SIP 200 OK response or a SIP 4xx or 5xx error response. In some examples, block 418 can include, in response to the request, performing at least one function of at least one of: a mobility management entity (MME), an S-GW, a P-GW, a serving GPRS support node (SGSN), a gateway GPRS support node (GGSN), a CSCF, a policy and charging rules function (PCRF), or an interconnection border control function (IBCF).

Figure 5:
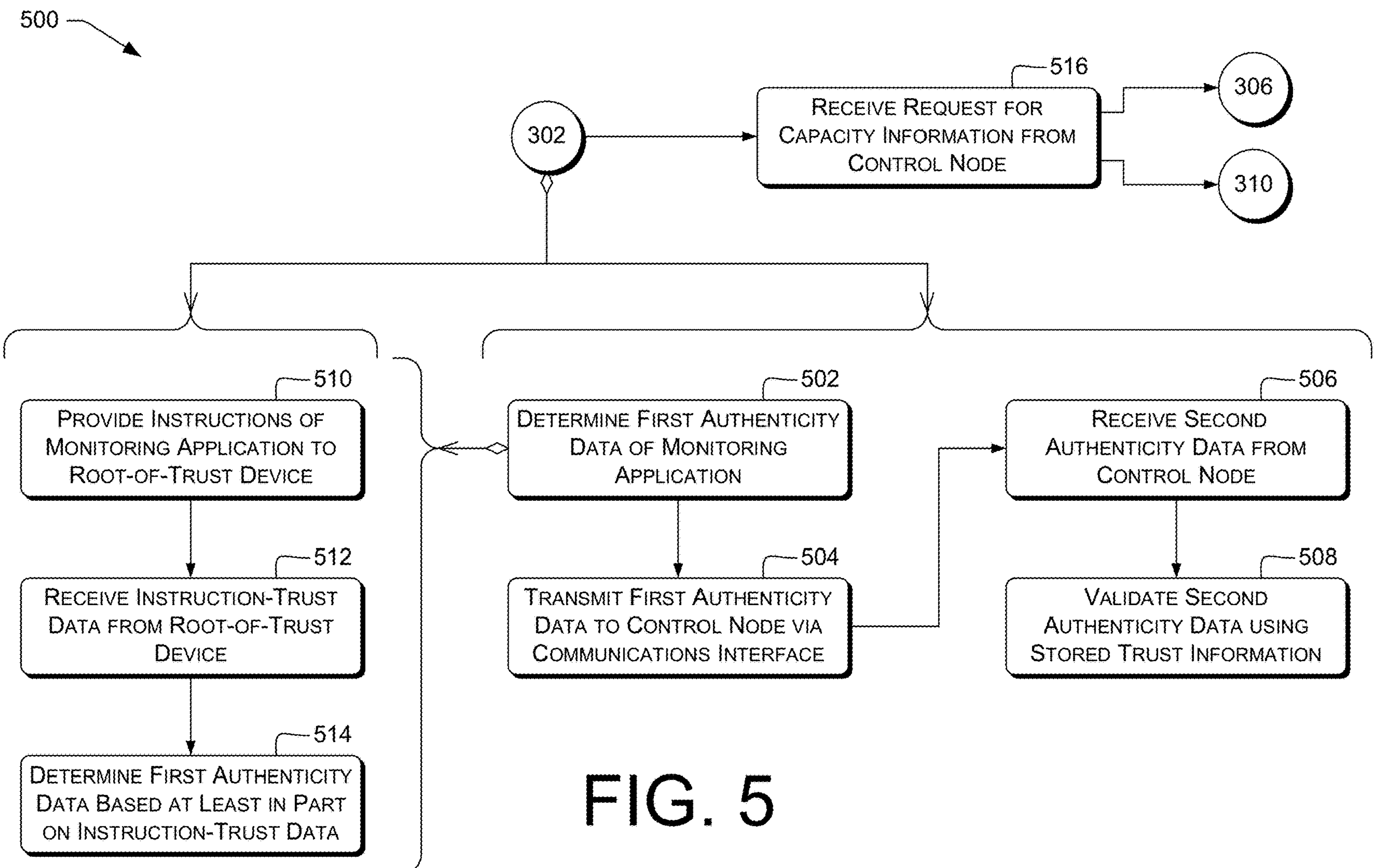
FIG. 5 illustrates an example process for interacting with a control node of a telecommunications network according to some implementations.

FIG. 5 illustrates an example process 500 for interacting with a control node. Process 500 can be carried out at an active service node 204, e.g., a portable computing device 102. In some examples, block 302 (establishing the authenticated connection) includes blocks 502 and 504, or blocks 502-508. In some examples using root-of-trust device 238, block 302 includes blocks 510, 512, and 514. In some examples, block 302 is followed by block 516.

At 502, service node 204 can determine first authenticity data of the monitoring application. For example, service node 204 can compute a hash, cryptographic signature, or other representation of computer program instructions, header fields, or other information of the monitoring application. In some examples, block 502 can include determining the first authenticity data further based at least in part on a shared secret or other information stored at service node 204. In some examples, block 502 can include receiving a nonce from the control node and determining the first authenticity data further based at least in part on the nonce. This can reduce the risk of replay attacks. The nonce can include, e.g., a timestamp, UUID, or random value. In some examples, block 502 can include blocks 510, 512, and 514, discussed below.

At 504, service node 204 can transmit the first authenticity data to the control node via the communications interface. In some examples, block 504 is followed by block 506. In some examples, omitted for brevity, blocks 506 and 508 are performed before blocks 502 and 504. Some examples using blocks 502-508 can provide mutual authentication between the service node 204 and the control node.

At 506, service node 204 can receive second authenticity data from the control node via the communications interface. For example, the second authenticity data can include a hash, signature, or other data noted above with reference to block 502. In some examples, block 506 can include transmitting a nonce to the control node. For example, the control node can receive the nonce from the service node 204, cryptographically sign the nonce using a private key, and transmit the signed nonce to the service node 204.

At 508, service node 204 can validate the second authenticity data using stored trust information. Continuing the example of nonce-signing, at block 508, the trust information can include a public key. Service node 204 can use the stored public key to validate the cryptographic signature from the control node. If the signature is valid, the second authenticity data can be considered valid. In some examples, root-of-trust device 238 can store the public key and perform the signature validation. This can reduce the risk of an attacker modifying the stored trust information in order to impersonate a control node.

In some examples, a hardware root-of-trust device 238 can be used in establishing the authenticated connection. For example, the hardware root-of-trust device 238 can store a private key associated with the service node 204 in a way that is not accessible to software running on the service node 204. This can reduce the risk of compromise of a private key.

At 510, service node 204 can provide computer program instructions of the monitoring application 240 to the hardware root-of-trust device 238. For example, processor 228 can stream the contents of a code segment in RAM 234 including the monitoring application 240 to the hardware root-of-trust device 238.

At 512, service node 204 can receive instruction-trust data associated with the computer program instructions of the monitoring application from the hardware root-of-trust device 238. For example, the instruction-trust data can include a cryptographic signature of the computer program instructions, made using the private key accessible only to the hardware root-of-trust device 238.

At 514, service node 204 can determine the first authenticity data based at least in part on the instruction-trust data. For example, the first authenticity data can be or comprise the instruction-trust data. This can permit the control node to determine, e.g., using a stored public key of the service node 204, whether the monitoring application is running known code.

At 516, service node 204 can receive, from the control node via the authenticated connection, a request for capacity information. Block 516 can be followed by block 306 or block 310, thereby transmitting the indication of the present operational capacity in response to the request for capacity information.

FIG. 6 is a flowchart and block diagram illustrating an example environment 600 for scheduling tasks. A service node 602, e.g., a control node or other service node, can carry out a process 604 for scheduling the tasks to be performed by one or more service nodes 606(1)-606(K) (individually and/or collectively referred to herein with reference 606), for integer $K \geq 1$, each of which can represent, e.g., service node 204. Environment 600 can additionally or alternatively include a peer computing device 608, e.g., a computing device 102 or infrastructure node 106. Examples of service node 602 can include at least: the bootstrap control node 112; an infrastructure node 106 configured to perform functions of process 604; or an active service node 204, e.g., a portable computing device 102, configured to perform functions of process 604. In some examples, functions of process 604 are carried out under control of a network functional module 242 executing in a trusted execution environment 244. In FIG. 6, dashed arrows represent dataflow and solid arrows represent control flow.

At 610, service node 602 can receive respective operational-capacity data values from a plurality of service nodes 606 (e.g., portable computing devices 102) via respective authenticated connections. The term "value" is singular for convenience. A data value can include a scalar, string, or other primitive value, or a tuple, record, instance, or other composite value, in any combination. In some examples, block 610 can be followed by block 612. In some examples, block 610 can be followed by block 614, which can be followed by blocks 618 and 620, as indicated by the dotted lines. For example, block 610 can include receiving, from at least one service node 606 of the plurality of service nodes 606, the respective operational-capacity data value(s) indicating processor, network, or storage capacity, or any combination thereof. In some examples, each service node 606 can report: capacity of all of a set of categories (e.g., processor, memory, or network); capacity of some of the set of categories; capacity only for categories in which that service node 204 has capacity available; or any combination thereof.

At 612, service node 602 can determine local operational-capacity data of the service node 602. Examples are discussed herein, e.g., with reference to block 306. The local operational-capacity data can include a data value (e.g., primitive, tuple, or other) as discussed herein with reference to block 610. Block 612 can include determining capacity of all of a set of categories or of some of the set of categories. For examples, service node 602 can determine only processor capacity.

At 614, service node 602 can receive a request from a peer computing device 608 via a communications interface 236 of the service node 602. Examples are discussed herein, e.g., with reference to block 416. The peer computing device 608 can be, e.g., a portable computing device, or a different peer or other device, e.g., an infrastructure node 106. In some examples, the peer computing device 608 represents a computing device 102 or an infrastructure node 106 acting as service node 602. For example, a smartphone (service node 602) running functions of a TAS can anchor sessions for that smartphone itself as well as for other smartphones.

At 616, service node 204 can determine, based at least in part on the request and the local operational-capacity data, that the service node 602 is unable to perform at least one operation associated with the request. The operation(s) associated with a request can be determined by providing at least part of the request to a stored table or other ruleset, or to dedicated program code, that provides the operation(s). The stored table, ruleset, or code can also provide resource requirements for the operation(s). Block 616 can include performing a query for operation(s) and their resource requirements, in these and other examples. Block 616 can also include comparing the resource requirements to the local operational-capacity data, and determining whether the service node 602 has enough local capacity to perform the operation(s). In the illustrated example, block 616 includes determining that at least one resource requirement exceeds a corresponding local operational capacity.

In the example above in which service node 602 determines only processor capacity, service node 602 thereby does not have network capacity. Accordingly, network-intensive operations such as streaming, large-file transfer, or data merging will have requirements for network bandwidth that exceed the local capacity. Restricting the categories of capacity determined can permit service node 602 to retain capacity for responding to changing conditions. For example, retaining network capacity to receive requests and transmit responses can reduce the probability of the service node 602 becoming non-responsive to peer computing device(s) 608.

At 618, service node 602 can determine, based at least in part on the request and at least some of the operational-capacity data values, a selected service node 606, e.g., a selected computing device of a plurality of portable computing devices. For example, service node 602 can select at least one service node 606 for each of the operation(s). Each selected service node can have enough capacity, as indicated by the operational-capacity data received at block 610, to perform the associated operation(s). This can be done using, e.g., conventional job-scheduling or load-balancing algorithms such as those used in APACHE HADOOP or other job-sharing or cluster-computing systems.

At 620, service node 602 can transmit an indication of the operation to the selected service node 606, e.g., the selected computing device, via the respective authenticated connection. For example, service node 602 can transmit a SIP request, a request in a custom protocol, or other work-sharing information to the selected service node 606 to cause the selected service node 606 to perform the operation. Block 620 can include transmitting at least some of the request, or values determined based on the request, so that the selected service node 606 can perform the operation.

In some examples, a request is associated with multiple operations. In some of these examples, blocks 618 and 620 can be repeated one or more times so that each operation the service node 602 is unable to perform is dispatched to an appropriate service node 606.

Figure 7:
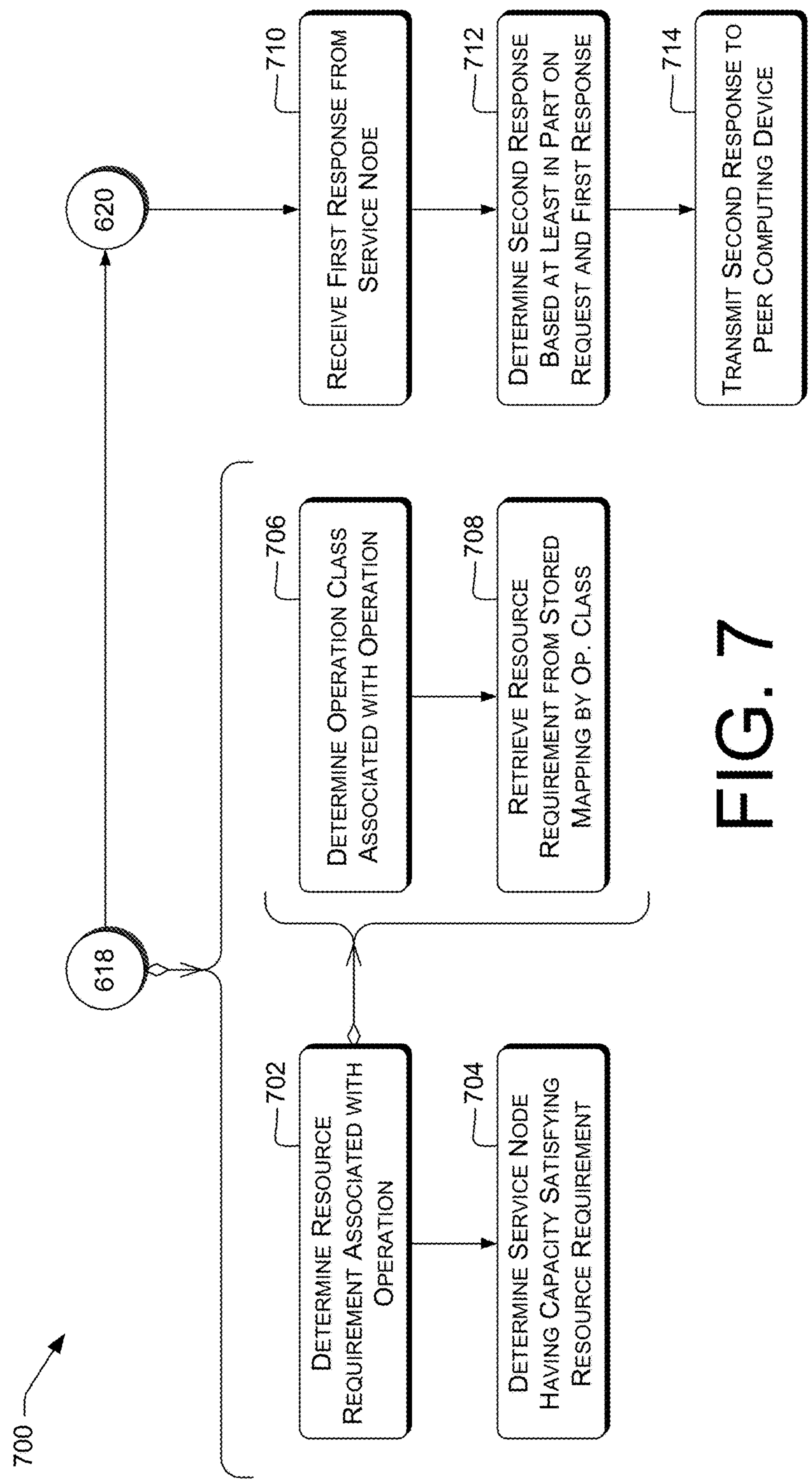
FIG. 7 illustrates an example process for scheduling or performing tasks in a telecommunications network according to some implementations.

FIG. 7 illustrates an example process 700 for scheduling and performing tasks. Process 500 can be carried out at an active service node 602, e.g., a portable computing device 102. In some examples, determining the selected computing device (service node 606) at block 618 can include blocks 702 and 704, or blocks 702-708. In some examples, block 620 can be followed by block 710.

At 702, service node 602 can determine at least one resource requirement associated with the operation. Block 702 can include blocks 706 and 708. Resource requirements can be determined, e.g., using lookup tables or other techniques described herein with reference to block 616.

At 704, service node 602 can determine the selected service node 606 having a respective operational-capacity data value satisfying the at least one resource requirement. For example, service node 602 can select a service node 606 having capacity for the operation from among the plurality of service nodes 606.

At 706, service node 602 can determine an operation class associated with the operation. For example, the operation class can indicate that the operation generally is limited by, e.g., bandwidth, processor cycles, storage space, or another resource category. The relationships between operation classes and operations can be one-to-one or one-to-many. In some examples, the operation class can be determined along with, or as described above with respect to, the determination of the operation in block 616.

At 708, service node 602 can retrieve the at least one resource requirement from a stored mapping indexed by the operation class. Lookups can be performed as discussed herein with reference to block 616.

At 710, service node 602 can receive a first response from the selected service node 606 via the respective authenticated connection. In some examples, block 712 can include receiving multiple first responses from respective service nodes 606. For example, each response can correspond to a separate operation, as discussed above.

At 712, service node 602 can determine a second response based at least in part on the request and the first response. For example, the second response can be or include part or all of the first response, or can be derived from the first response. In some examples, block 712 can include determining the response based on the multiple first responses received at block 710. Processing at block 712 can be performed, e.g., to implement network specifications such as 3GPP or Internet Engineering Task Force (IETF) specifications. Examples are discussed herein, e.g., with reference to block 418.

At 714, service node 602 can transmit the second response to the peer computing device via the communications interface. Examples are discussed herein, e.g., with reference to block 418.

Figure 8:
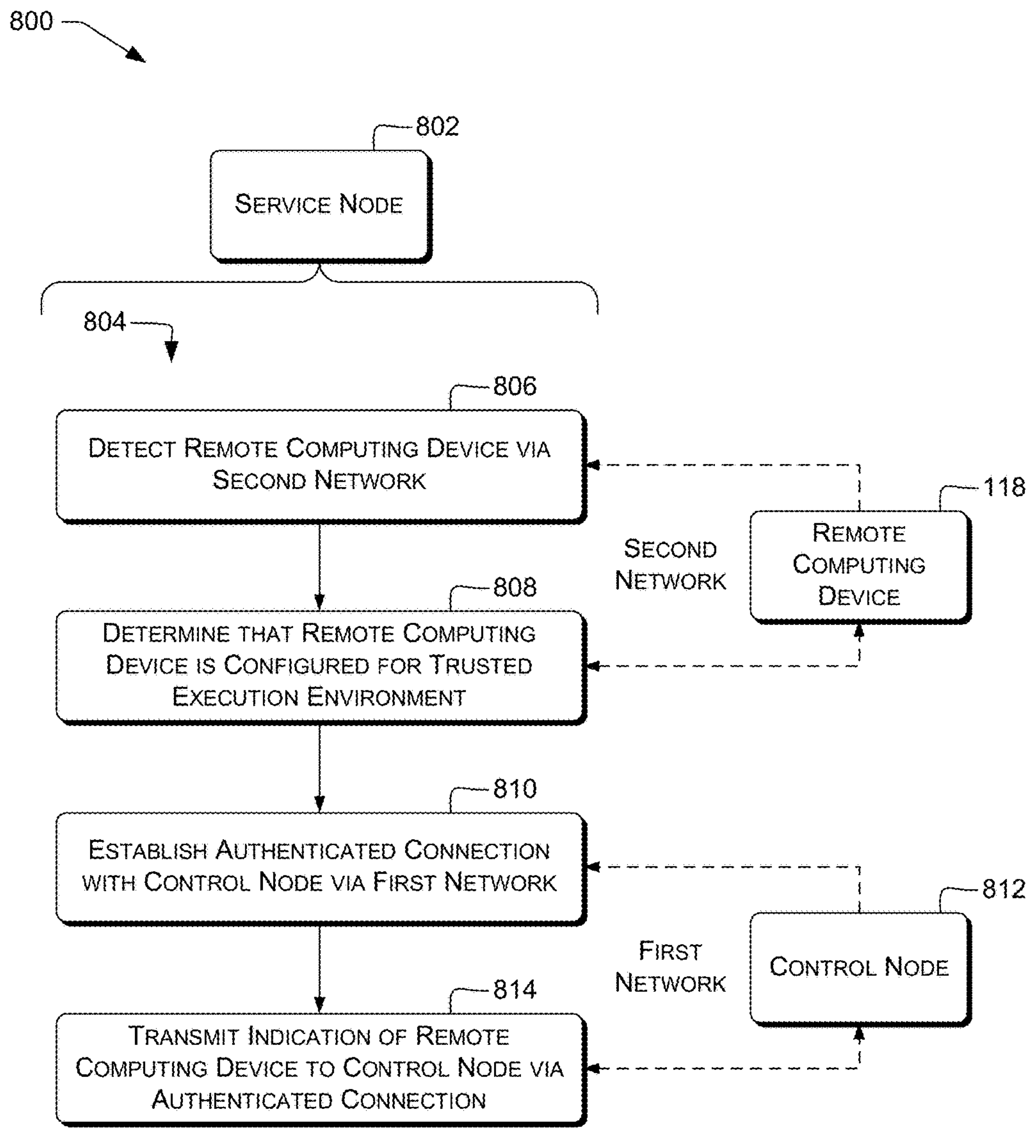
FIG. 8 illustrates an example environment for controlling a remote computing device according to some implementations.

FIG. 8 illustrates an example environment 800 for controlling a remote computing device 118. A service node 802, e.g., a service node 204, can carry out a process 804 for locating a remote computing device 118 and permitting that device to function as an additional service node, as described above. Service node 802 can include, e.g., a portable computing device 102 or infrastructure node 106. Process 804 can be carried out, e.g., by monitoring application 240 running on service node 802. In some examples, service node 802 includes a first communications interface (e.g., of the communications interface(s) 236) configured to communicate via a first network. The first network can include a wireless network, e.g., an LTE network. In some examples, service node 204 includes a second communications interface (e.g., of the communications interface(s) 236) configured to communicate via a second network different from the first network. The second network can include a wired or wireless network or other network described herein with reference to second network 116.

At 806, service node 802 can detect, via the second network, a remote computing device 118. For example, service node 802 can use a BLUETOOTH, WIFI, or other detection algorithm to locate other computing devices communicatively connectable with service node 802 via the second network. Those computing devices can include remote computing device 118, e.g., an IoT device or UE.

At 808, service node 802 can determine that the remote computing device 118 is configured to execute computer program instructions in a trusted execution environment. Examples are discussed herein, e.g., with reference to block 304 and FIGS. 4 and 5. For example, service node 802 can perform authentication functions described herein with reference to control nodes, and remote computing device 118 can perform authentication functions described herein with reference to service nodes. Block 808 can include, e.g., at least transmitting a nonce to the remote computing device 118, receiving authorization information (e.g., a signed nonce) from the remote computing device 118, or verifying authorization information from the remote computing device 118, e.g., using a known public key of the remote computing device 118 or a shared secret. Additionally or alternatively, block 808 can include receiving capacity data from the remote computing device 118, as discussed herein with reference to block 610.

At 810, service node 802 can establish an authenticated connection with a control node 812 via the first network, e.g., using the first communications interface. Examples are discussed herein, e.g., with reference to block 302.

At 814, service node 802 can transmit an indication of the remote computing device 118 to the control node 812 via the authenticated connection. Examples are discussed herein, e.g., with reference to block 310. For example, service node 802 can transmit to control node 812 the indication, e.g., a hostname, network address, UUID, or other identifying information. Service node 802 can additionally or alternatively transmit to control node 812 capacity data associated with the remote computing device 118. In some examples in which service node 802 is connected with multiple remote computing devices 118, block 814 can include transmitting indications of at least one of, or all of, the remote computing devices 118.

Figure 9:
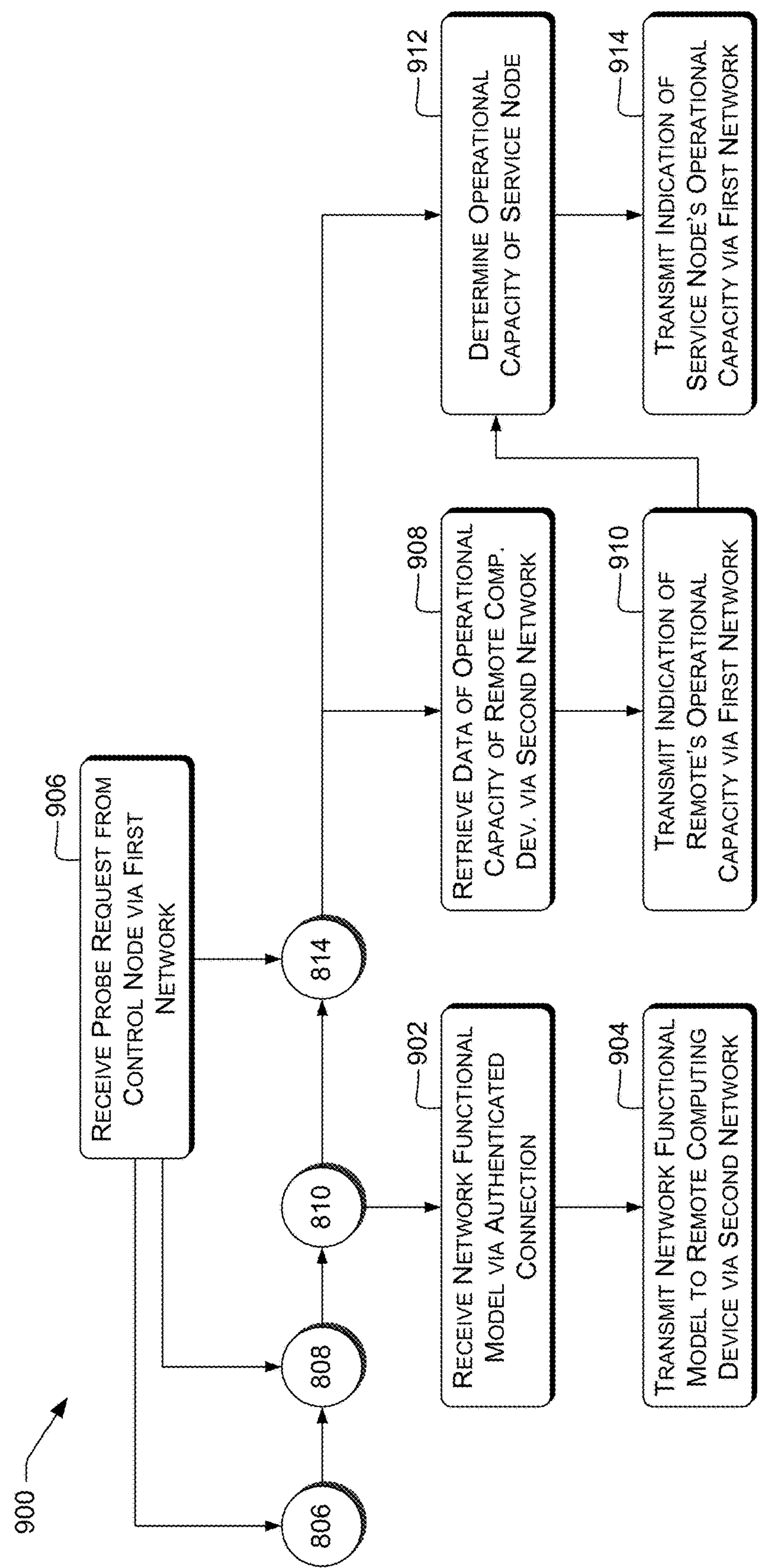
FIG. 9 illustrates an example process for mediating communications between a remote computing device and a control node of a telecommunications network according to some implementations.

FIG. 9 illustrates an example process 900 for mediating communications between a remote computing device 118 and a control node 812. Process 900 can be performed by a service node 802, e.g., a portable computing device 102. In some examples, block 810 can be followed by block 902. In some examples, at least one of blocks 806, 808, or 814 can be preceded by block 906. In some examples, block 814 can be followed by at least one of blocks 908, 910, 912, or 914.

At 902, service node 802 can receive a network functional module comprising computer program instructions via the authenticated connection. Examples are discussed herein, e.g., with reference to blocks 402, 406, or 408. The computer program instructions can be instructions for or executable on a processor of the remote computing device 118, which may or may not be the same as the processor of the service node 802. In some examples, service node 802 and remote computing device 118 share a code format, e.g., JAVA, and the network functional module 242 includes, e.g., JAVA bytecode. In some examples, service node 802 and remote computing device 118 have respective, different code formats, e.g., x86 machine language and ARM machine language, respectively, and the network functional module 242 includes, e.g., code in the code format of the remote computing device 118. In some examples, techniques for transmitting or validating validate network functional modules for execution on service nodes 204, e.g., as discussed herein with reference to operation 304, can additionally or alternatively be used to transmit or validate network functional modules for execution on remote computing device 118.

At 904, service node 802 can transmit the network functional module 242 to the remote computing device 118 via the second network, e.g., using the second communications interface. For example, the network functional module 242 can be transmitted via a TLS-secured connection. Along with the network functional module 242 can be transmitted information establishing the authorization of the network functional module 242 to execute on the remote computing device 118, e.g., a cryptographic signature or other information described herein.

At 906, service node 802 can receive a probe request from a control node via the first network. The probe request can include, e.g., an HTTPS GET to a URL endpoint designated for probes. Block 906 can be followed by at least one of blocks 806 or 808 and by block 814. This can permit, in response to the probe request, performing the detecting of the remote computing device 118 (at blocks 806 or 808) and the transmitting the indication of the remote computing device via the authenticated connection (at block 814). In some examples, pull-based probing using probe requests can reduce the network bandwidth required for work-sharing information.

At 908, service node 802 can retrieve from the remote computing device 118, via the second communications network, data of a present operational capacity of the remote computing device 118. Examples are discussed herein, e.g., with reference to block 610.

At 910, service node 802 can transmit an indication of the present operational capacity of the remote computing device(s) 118 to a control device via the first communications network. Examples are discussed herein, e.g., with reference to block 310, except that the capacity of a remote computing device 118 is being transmitted instead of the capacity information of the service node 802 performing block 910. In some examples, block 910 can be followed by block 912. In some examples, at least one of blocks 912 or 914 can be performed before or in parallel with at least one of blocks 908 or 910.

At 912, service node 802 can determine its own present operational capacity, e.g., a capacity of a portable computing device. Examples are discussed herein, e.g., with reference to block 306.

At 914, service node 802 can transmit an indication of the present operational capacity of the portable computing device to the control node via the authenticated connection. Examples are discussed herein, e.g., with reference to block 310.

Figure 10:
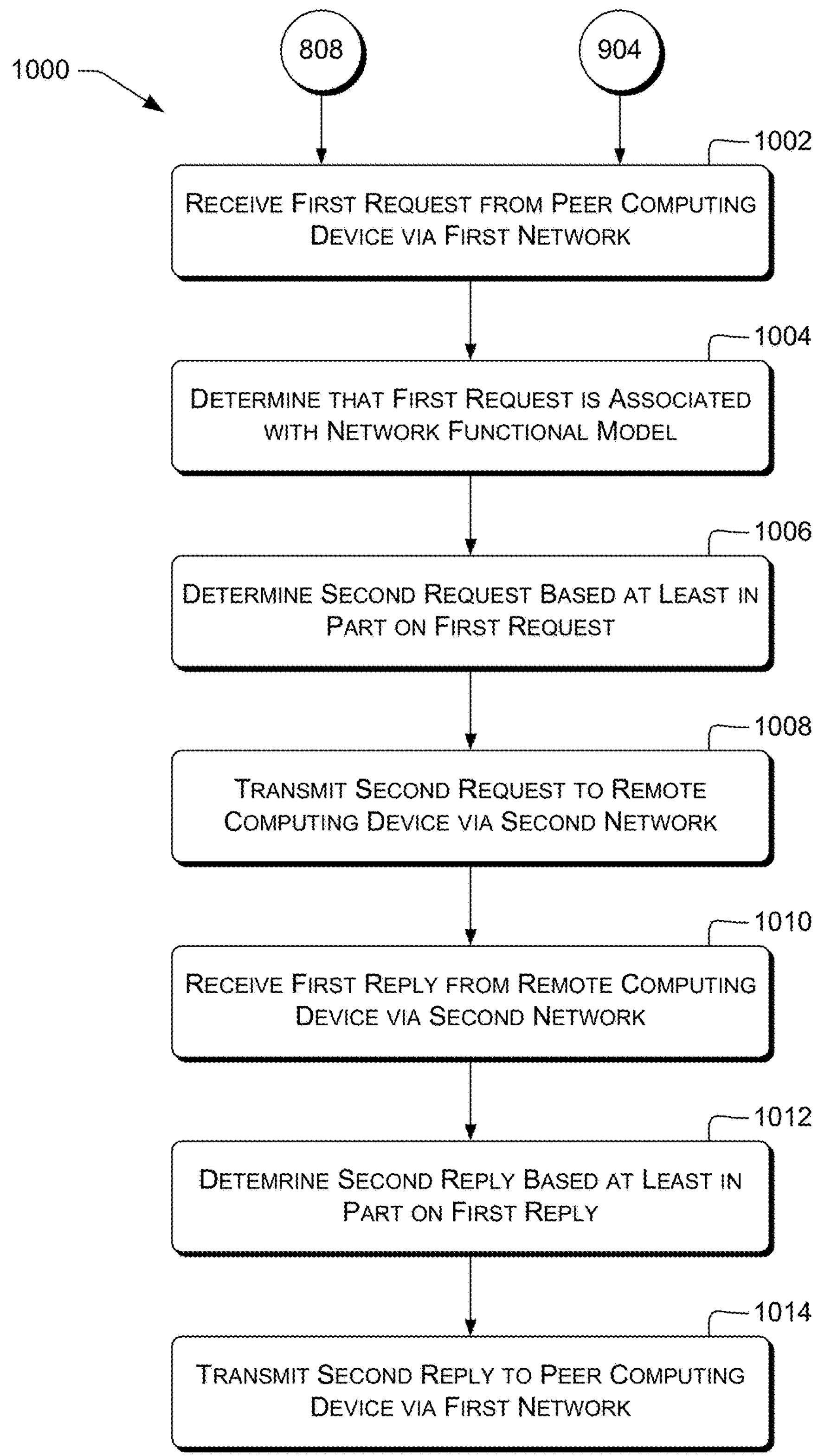
FIG. 10 illustrates an example process for processing a request from a peer computing device in a telecommunications network according to some implementations.

FIG. 10 illustrates an example process 1000 for processing a request from a peer computing device. Process 1000 can be performed by a service node 802, e.g., a portable computing device 102, or by control node 812. In some examples, block 808 (or any a subsequent block in process 804 or 900), or block 904, can be followed by block 1002.

At 1002, service node 802 can receive a first request from a peer computing device via the first network. Examples are discussed herein, e.g., with reference to block 614.

At 1004, service node 802 can determine that the first request is associated with a known network functional module 242. For example, the known network functional module 242 can include at least one of: the network functional module 242 transmitted to the remote computing device 118 as discussed herein with reference to block 904, a network functional module 242 that remote computing device 118 has previously identified to service node 802, e.g., by a class name or UUID, or another network functional module 242 indicated in reliable information available to service node 802 as being ready for execution on remote computing device 118.

At 1006, service node 802 can determine a second request based at least in part on the first request. The second request can correspond to at least one operation associated with the first request. Examples are discussed herein, e.g., with reference to blocks 616 and 618 and FIG. 7.

At 1008, service node 802 can provide the second request to the remote computing device 118 via the second network. Examples are discussed herein, e.g., with reference to block 620.

At 1010, service node 802 can receive a first reply from the remote computing device 118 via the second network. Examples are discussed herein, e.g., with reference to block 710.

At 1012, service node 802 can determine a second reply based at least in part on the first reply. Examples are discussed herein, e.g., with reference to block 712.

At 1014, service node 802 can transmit the second reply to the peer computing device via the first network. Examples are discussed herein, e.g., with reference to block 714.

Example Clauses

A: A portable computing device, comprising: a processor; a communications interface configured to communicate via a wireless network; at least one computer-readable medium; and a monitoring application stored in the at least one computer-readable medium and executable by the processor to cause the processor to perform operations comprising: establishing an authenticated connection with a control node via the communications interface; validating a trusted execution environment of the portable computing device to provide a validation result; determining a present operational capacity of the portable computing device; transmitting an indication of the validation result to the control node via the authenticated connection; and transmitting an indication of the present operational capacity to the control node via the authenticated connection.

B: The portable computing device according to paragraph A, wherein: the operations comprise: receiving, via the authenticated connection, a network functional module comprising computer-executable instructions executable by the processor to cause the processor to perform second operations; and configuring the processor to execute the network functional module in the trusted execution environment; and the second operations comprise at least: receiving a request from a peer computing device via the communications interface; and providing a response to the peer computing device via the communications interface.

C: The portable computing device according to paragraph B, wherein the second operations comprise, in response to the request, performing at least one function of at least one of: a mobility management entity (MME), a serving gateway (S-GW), a packet data network gateway (P-GW), a serving general packet radio service (GPRS) support node (SGSN), a gateway GPRS support node (GGSN), a call session control function (CSCF), a policy and charging rules function (PCRF), or an interconnection border control function (IBCF).

D: The portable computing device according to any of paragraphs A-C, wherein: the at least one computer-readable medium comprises computer-executable instructions of a plurality of network functional modules; and the operations comprise: receiving, via the authenticated connection, an indication of a selected network functional module of the plurality of network functional modules; and configuring the processor to execute the selected network functional module in the trusted execution environment.

E: The portable computing device according to paragraph D, wherein the operations comprise: receiving, via the communications interface, the computer-executable instructions of a first network functional module of the plurality of network functional modules; determining that the computer-executable instructions of the first network functional module are authorized for execution; and storing the computer-executable instructions of the first network functional module in the at least one computer-readable medium.

F: The portable computing device according to any of paragraphs A-E, wherein the operations comprise: determining the present operational capacity based at least in part on at least an available capacity of the processor; an available capacity of a high-speed memory of the portable computing device; a signal strength of the wireless network at the portable computing device; a transfer capacity of the communications interface; a present power supply situation of the portable computing device; or a present battery capacity of a battery of the portable computing device.

G: The portable computing device according to any of paragraphs A-F, wherein the operations for establishing the authenticated connection comprise: determining first authenticity data of the monitoring application; and transmitting the first authenticity data to the control node via the communications interface.

H: The portable computing device according to paragraph G, wherein the operations for establishing the authenticated connection comprise: receiving second authenticity data from the control node via the communications interface; and validating the second authenticity data using stored trust information.

I: The portable computing device according to paragraph G or H, comprising a hardware root-of-trust device, wherein the operations for establishing the authenticated connection comprise: providing computer program instructions of the monitoring application to the hardware root-of-trust device; receiving instruction-trust data associated with the computer program instructions of the monitoring application from the hardware root-of-trust device; and determining the first authenticity data based at least in part on the instruction-trust data.

J: The portable computing device according to any of paragraphs A-I, the operations comprising: receiving, from the control node via the authenticated connection, a request for capacity information; and transmitting the indication of the present operational capacity in response to the request for capacity information.

K: A method, comprising, at a portable computing device and under control of a network functional module executing in a trusted execution environment: receiving respective operational-capacity data values from a plurality of portable computing devices via respective authenticated connections; determining local operational-capacity data of the portable computing device; receiving a request from a peer computing device via a communications interface of the portable computing device; determining, based at least in part on the request and the local operational-capacity data, that the portable computing device is unable to perform at least one operation associated with the request; determining, based at least in part on the request and at least some of the operational-capacity data values, a selected computing device of the plurality of portable computing devices; and transmitting an indication of the operation to the selected computing device via the respective authenticated connection.

L: The method according to paragraph K, comprising: receiving a first response from the selected computing device via the respective authenticated connection; determining a second response based at least in part on the request and the first response; and transmitting the second response to the peer computing device via the communications interface.

M: The method according to paragraph K or L, comprising determining the selected computing device by: determining at least one resource requirement associated with the operation; and determining the selected computing device having a respective operational-capacity data value satisfying the at least one resource requirement.

N: The method according to paragraph M, comprising: determining an operation class associated with the operation; and retrieving the at least one resource requirement from a stored mapping indexed by the operation class.

O: The method according to any of paragraphs K-N, executed at a control device, e.g., a dedicated or cloud server or an infrastructure node, instead of at a portable computing device. (For example, the control device can schedule operations across service nodes.)

P: The method according to any of paragraphs K-O, wherein the selected computing device is configured to execute computer program instructions in a trusted execution environment.

Q: A portable computing device, comprising: a processor; a first communications interface configured to communicate via a first network, the first network comprising a wireless network; a second communications interface configured to communicate via a second network different from the first network; at least one computer-readable medium; and a monitoring application stored in the at least one computer-readable medium and executable by the processor to cause the processor to perform operations comprising: detecting, via the second network, a remote computing device; determining that the remote computing device is configured to execute computer program instructions in a trusted execution environment; establishing an authenticated connection with a control node via the first network; transmitting an indication of the remote computing device to the control node via the authenticated connection.

R: The portable computing device according to paragraph Q, wherein the operations comprise: receiving a network functional module comprising computer program instructions via the authenticated connection; and transmitting the network functional module to the remote computing device via the second network.

S: The portable computing device according to paragraph R, wherein the operations comprise: receiving a first request from a peer computing device via the first network; determining that the first request is associated with the network functional module; determining a second request based at least in part on the first request; transmitting the second request to the remote computing device via the second network; receiving a first reply from the remote computing device via the second network; determining a second reply based at least in part on the first reply; and transmitting the second reply to the peer computing device via the first network.

T: The portable computing device according to any of paragraphs Q-S, wherein the operations comprise: receiving a probe request from the control node via the first network; and in response to the probe request, performing the detecting of the remote computing device and the transmitting of the indication of the remote computing device.

U: The portable computing device according to any of paragraphs Q-T, wherein the operations comprise: retrieving from the remote computing device, via the second communications network, data of a present operational capacity of the remote computing device; and transmitting an indication of the present operational capacity of the remote computing device to a control device via the first communications network.

V: The portable computing device according to any of paragraphs Q-U, wherein the operations comprise: determining a present operational capacity of the portable computing device; and transmitting an indication of the present operational capacity of the portable computing device to the control node via the authenticated connection.

W: The portable computing device according to any of paragraphs Q-V, wherein the first and second networks are incompatible with each other.

X: A computer-readable medium, e.g., a computer storage medium, having thereon computer-executable instructions, the computer-executable instructions upon execution configuring a computer to perform operations as any of paragraphs A-J, or K-P, or Q-W recites.

Y: A device comprising: a processor; and a computer-readable medium, e.g., a computer storage medium, having thereon computer-executable instructions, the computer-executable instructions upon execution by the processor configuring the device to perform operations as any of paragraphs A-J, or K-P, or Q-W recites.

Z: A system comprising: means for processing; and means for storing having thereon computer-executable instructions, the computer-executable instructions including means to configure the system to carry out operations as any of paragraphs A-J, or K-P, or Q-W recites.

AA: A method, comprising performing operations as any of paragraphs A-J or Q-W recites.

CONCLUSION

As used herein, a message "transmitted to" or "transmitted toward" a destination, or similar terms, can be transmitted directly to the destination, or can be transmitted via one or more intermediate network devices to the destination. Similarly, a message "received from" a destination can be received directly from the destination, or can be received via one or more intermediate network devices from the destination. A message passing through one or more intermediate network devices can be modified by those network devices, e.g., by adding or removing framing, or by changing a presentation of at least part of the message, e.g., from a SIP start-line to a SIP header or vice versa.

Example data transmissions and exchanges described herein, and example blocks in the process and block diagrams of FIGS. 3-10, represent one or more operations that can be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly set forth herein, the order in which the operations or transmissions are described is not intended to be construed as a limitation, and any number of the described operations or transmissions can be executed or performed in any order, combined in any order, subdivided into multiple sub-operations or transmissions, and/or executed or transmitted in parallel to implement the described processes.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Some examples herein are described in the context of a VoLTE network with SIP signaling for clarity of explanation. However, other networks and signaling systems employing operations described herein are encompassed within this disclosure. For example, techniques herein can be used with publish/subscribe protocols such as ZEROMQ running over IP networks. Similarly, this disclosure refers to similar operations being performed by protocols evolved from IP, SIP, and VoLTE.

Software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

The word "or" and the phrase "and/or" are used herein in an inclusive sense unless specifically stated otherwise. Accordingly, conjunctive language such as the phrases "X, Y, or Z," "X, Y, and/or Z," and/or "at least one of X, Y or Z," unless specifically stated otherwise, is to be understood as signifying that an item, term, etc., can be either X, Y, or Z, or a combination thereof. Conditional language such as, among others, "can," "could," "might," or "may," unless specifically stated otherwise, are understood within the context to present that certain examples include, while other examples do not include, certain features, elements, or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example.

Furthermore, although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims. Moreover, in the claims, any reference to a group of items provided by a preceding claim clause is a reference to at least some of the items in the group of items, unless specifically stated otherwise. The claimed subject matter is not limited to implementations that solve any or all disadvantages noted herein.

What is claimed is:

1. A portable computing device, comprising:
- a processor in the portable computing device;
- a communications interface configured to communicate via a wireless network;
- at least one non-transitory computer-readable medium in the portable computing device; and
- a monitoring application stored in the at least one non-transitory computer-readable medium and executable by the processor to cause the processor to perform operations comprising:
  - establishing an authenticated connection with a control node via the communications interface;
  - validating a trusted execution environment of the portable computing device to provide a validation result;
  - determining a present operational capacity of the portable computing device;
  - transmitting an indication of the validation result to the control node via the authenticated connection; and
  - transmitting an indication of the present operational capacity to the control node via the authenticated connection.

2. The portable computing device according to claim 1, wherein:
- the operations comprise:
  - receiving, via the authenticated connection, a network functional module comprising computer-executable instructions executable by the processor to cause the processor to perform second operations; and
  - configuring the processor to execute the network functional module in the trusted execution environment; and
- the second operations comprise at least:
  - receiving a request from a peer computing device via the communications interface; and
  - providing a response to the peer computing device via the communications interface.

3. The portable computing device according to claim 2, wherein the second operations comprise, in response to the request, performing at least one function of at least one of: a mobility management entity (MME), a serving gateway (S-GW), a packet data network gateway (P-GW), a serving general packet radio service (GPRS) support node (SGSN), a gateway GPRS support node (GGSN), a call session control function (CSCF), a policy and charging rules function (PCRF), or an interconnection border control function (IBCF).

4. The portable computing device according to claim 1, wherein:

the at least one non-transitory computer-readable medium comprises computer-executable instructions of a plurality of network functional modules; and the operations comprise:

receiving, via the authenticated connection, an indication of a selected network functional module of the plurality of network functional modules; and configuring the processor to execute the selected network functional module in the trusted execution environment.

5. The portable computing device according to claim 4, wherein the operations comprise:

receiving, via the communications interface, the computer-executable instructions of a first network functional module of the plurality of network functional modules;

determining that the computer-executable instructions of the first network functional module are authorized for execution; and storing the computer-executable instructions of the first network functional module in the at least one non-transitory computer-readable medium.

6. The portable computing device according to claim 1, wherein the operations comprise:

determining the present operational capacity based at least in part on at least an available capacity of the processor; an available capacity of a high-speed memory of the portable computing device; a signal strength of the wireless network at the portable computing device; a transfer capacity of the communications interface; a present power supply situation of the portable computing device; or a present battery capacity of a battery of the portable computing device.

7. The portable computing device according to claim 1, wherein the operations for establishing the authenticated connection comprise:

determining first authenticity data of the monitoring application; and transmitting the first authenticity data to the control node via the communications interface.

8. The portable computing device according to claim 7, wherein the operations for establishing the authenticated connection comprise:

receiving second authenticity data from the control node via the communications interface; and validating the second authenticity data using stored trust information.

9. The portable computing device according to claim 7, comprising a hardware root-of-trust device, wherein the operations for establishing the authenticated connection comprise:

providing computer program instructions of the monitoring application to the hardware root-of-trust device;

receiving instruction-trust data associated with the computer program instructions of the monitoring application from the hardware root-of-trust device; and determining the first authenticity data based at least in part on the instruction-trust data.

10. The portable computing device according to claim 1, the operations comprising:

receiving, from the control node via the authenticated connection, a request for capacity information; and transmitting the indication of the present operational capacity in response to the request for capacity information.

11. A method, comprising, at a portable computing device and under control of a network functional module executing in a trusted execution environment:

receiving, at the portable computing device, respective operational-capacity data values from a plurality of other portable computing devices via respective authenticated connections;

determining local operational-capacity data of the portable computing device;

receiving a request from a peer computing device via a communications interface of the portable computing device;

determining, based at least in part on the request and the local operational-capacity data, that the portable computing device is unable to perform at least one operation associated with the request;

determining, based at least in part on the request and at least some of the operational-capacity data values, a selected computing device of the plurality of portable computing devices; and transmitting an indication of the operation to the selected computing device via the respective authenticated connection.

12. The method according to claim 11, comprising:

receiving a first response from the selected computing device via the respective authenticated connection;

determining a second response based at least in part on the request and the first response; and transmitting the second response to the peer computing device via the communications interface.

13. The method according to claim 11, comprising determining the selected computing device by:

determining at least one resource requirement associated with the operation; and determining the selected computing device having a respective operational-capacity data value satisfying the at least one resource requirement.

14. The method according to claim 13, comprising:

determining an operation class associated with the operation; and retrieving the at least one resource requirement from a stored mapping indexed by the operation class.

15. A portable computing device, comprising:

a processor in the portable computing device;

a first communications interface configured to communicate via a first network, the first network comprising a wireless network;

a second communications interface configured to communicate via a second network different from the first network;

at least one non-transitory computer-readable medium; and a monitoring application stored in the at least one non-transitory computer-readable medium and executable by the processor to cause the processor to perform operations comprising:

detecting, via the second network, a remote computing device;

determining that the remote computing device is configured to execute computer program instructions in a trusted execution environment;

establishing an authenticated connection with a control node via the first network; and transmitting an indication of the remote computing device to the control node via the authenticated connection.

16. The portable computing device according to claim 15, wherein the operations comprise:

receiving a network functional module comprising computer program instructions via the authenticated connection; and transmitting the network functional module to the remote computing device via the second network.

17. The portable computing device according to claim 16, wherein the operations comprise:

receiving a first request from a peer computing device via the first network;

determining that the first request is associated with the network functional module;

determining a second request based at least in part on the first request;

transmitting the second request to the remote computing device via the second network;

receiving a first reply from the remote computing device via the second network;

determining a second reply based at least in part on the first reply; and transmitting the second reply to the peer computing device via the first network.

18. The portable computing device according to claim 15, wherein the operations comprise:

receiving a probe request from the control node via the first network; and in response to the probe request, performing the detecting of the remote computing device and the transmitting of the indication of the remote computing device.

19. The portable computing device according to claim 15, wherein the operations comprise:

retrieving from the remote computing device, via the second network, data of a present operational capacity of the remote computing device; and transmitting an indication of the present operational capacity of the remote computing device to a control device via the first network.

20. The portable computing device according to claim 15, wherein the operations comprise:

determining a present operational capacity of the portable computing device; and transmitting an indication of the present operational capacity of the portable computing device to the control node via the authenticated connection.

* * * * *